United States Patent
Nishio et al.

(10) Patent No.: US 12,150,101 B2
(45) Date of Patent: *Nov. 19, 2024

(54) RECEIVING APPARATUS AND METHOD THEREOF

(71) Applicant: Panasonic Holdings Corporation, Osaka (JP)

(72) Inventors: Akihiko Nishio, Osaka (JP); Christian Wengerter, Kleinheubach (DE); Hidetoshi Suzuki, Kanagawa (JP); Masaru Fukuoka, Ishikawa (JP)

(73) Assignee: Panasonic Holdings Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,339

(22) Filed: Feb. 20, 2024

(65) Prior Publication Data

US 2024/0196381 A1 Jun. 13, 2024

Related U.S. Application Data

(63) Continuation of application No. 17/879,681, filed on Aug. 2, 2022, now Pat. No. 11,943,752, which is a
(Continued)

(30) Foreign Application Priority Data

| Jun. 19, 2007 | (JP) | 2007-161958 |
| Aug. 14, 2007 | (JP) | 2007-211545 |
| Mar. 6, 2008 | (JP) | 2008-056561 |

(51) Int. Cl.
*H04W 72/04* (2023.01)
*H04B 7/12* (2006.01)
(Continued)

(52) U.S. Cl.
CPC .......... *H04W 72/0446* (2013.01); *H04B 7/12* (2013.01); *H04L 1/0003* (2013.01);
(Continued)

(58) Field of Classification Search
None
See application file for complete search history.

(56) References Cited

U.S. PATENT DOCUMENTS

| 5,636,242 A | 6/1997 | Tsujimoto |
| 7,620,018 B2 | 11/2009 | Tee et al. |

(Continued)

FOREIGN PATENT DOCUMENTS

| CN | 2850147 Y | 12/2006 |
| CN | 101682390 B | 8/2013 |

(Continued)

OTHER PUBLICATIONS

Brazilian Office Action, dated Jul. 23, 2019, for Brazilian Patent Application No. P10813126-0, 5 pages. (with English Translation).
(Continued)

*Primary Examiner* — Brandon M Renner
(74) *Attorney, Agent, or Firm* — Seed IP Law Group LLP

(57) ABSTRACT

Provided is a radio communication base station device which can prevent lowering of use efficiency of a channel communication resource for performing a frequency diversity transmission when simultaneously performing a frequency scheduling transmission and the frequency diversity transmission in a multicarrier communication. In the device, a modulation unit (12) executes a modulation process on Dch data after encoded so as to generate a Dch data symbol. A modulation unit (22) executes a modulation process on the encoded Lch data so as to generate an Lch data symbol. An allocation unit (103) allocates the Dch data symbol and the Lch data symbol to respective subcarriers constituting an
(Continued)

OFDM symbol and outputs them to a multiplexing unit (104). Here, when a plurality of Dch are used for a Dch data symbol of one mobile station, the allocation unit (103) uses Dch of continuous channel numbers.

12 Claims, 27 Drawing Sheets

Related U.S. Application Data continuation of application No. 17/166,851, filed on Feb. 3, 2021, now Pat. No. 11,438,891, which is a continuation of application No. 16/681,496, filed on Nov. 12, 2019, now Pat. No. 10,952,211, which is a continuation of application No. 15/946,489, filed on Apr. 5, 2018, now Pat. No. 10,512,081, which is a continuation of application No. 15/451,099, filed on Mar. 6, 2017, now Pat. No. 9,967,879, which is a continuation of application No. 14/920,444, filed on Oct. 22, 2015, now Pat. No. 9,629,163, which is a continuation of application No. 14/250,101, filed on Apr. 10, 2014, now Pat. No. 9,204,444, which is a continuation of application No. 13/919,753, filed on Jun. 17, 2013, now Pat. No. 9,019,925, which is a continuation of application No. 13/308,118, filed on Nov. 30, 2011, now Pat. No. 8,509,141, which is a continuation of application No. 13/184,382, filed on Jul. 15, 2011, now Pat. No. 8,204,017, which is a continuation of application No. 12/846,447, filed on Jul. 29, 2010, now Pat. No. 8,040,832, which is a continuation of application No. 12/593,899, filed as application No. PCT/JP2008/001569 on Jun. 18, 2008, now Pat. No. 7,852,807.

(51) Int. Cl.
| | | |
|---|---|---|
| *H04L 1/00* | (2006.01) | |
| *H04L 5/00* | (2006.01) | |
| *H04W 72/0446* | (2023.01) | |
| *H04W 72/0453* | (2023.01) | |

(52) U.S. Cl.
CPC .......... *H04L 1/0009* (2013.01); *H04L 1/0071* (2013.01); *H04L 5/0007* (2013.01); *H04L 5/0028* (2013.01); *H04L 5/0039* (2013.01); *H04L 5/0041* (2013.01); *H04L 5/0092* (2013.01); *H04W 72/0453* (2013.01); *H04L 5/006* (2013.01); *H04L 5/0064* (2013.01); *H04L 5/0085* (2013.01)

(56) References Cited

U.S. PATENT DOCUMENTS

| | | | |
|---|---|---|---|
| 7,852,807 | B2 | 12/2010 | Nishio et al. |
| 7,864,903 | B2 | 1/2011 | Murakami et al. |
| 8,018,945 | B2 | 9/2011 | Zhang et al. |
| 8,040,832 | B2 | 10/2011 | Nishio et al. |
| 8,064,393 | B2 | 11/2011 | Fukuoka et al. |
| 8,144,799 | B2 | 3/2012 | Murakami et al. |
| 8,204,017 | B2 | 6/2012 | Nishio et al. |
| 8,208,436 | B2 | 6/2012 | Nishio et al. |
| 8,509,141 | B2 | 8/2013 | Nishio et al. |
| 8,724,729 | B2 | 5/2014 | Murakami et al. |
| 9,019,925 | B2 | 4/2015 | Nishio et al. |
| 9,094,203 | B2 | 7/2015 | Zhang et al. |
| 9,374,823 | B2 | 6/2016 | Nishio et al. |
| 2002/0071480 | A1 | 6/2002 | Marjelund et al. |
| 2002/0077141 | A1 | 6/2002 | Hwang et al. |
| 2002/0090938 | A1 | 7/2002 | Dharia et al. |
| 2002/0122410 | A1 | 9/2002 | Kulikov et al. |
| 2003/0123381 | A1 | 7/2003 | Zhuang et al. |
| 2004/0198405 | A1 | 10/2004 | Marinier |
| 2005/0053035 | A1 | 3/2005 | Kwak et al. |
| 2005/0195734 | A1 | 9/2005 | Sandell et al. |
| 2005/0243831 | A1 | 11/2005 | Zhang et al. |
| 2006/0067278 | A1 | 3/2006 | Li et al. |
| 2006/0092873 | A1* | 5/2006 | Khayrallah ........... H04L 1/0015 370/341 |
| 2006/0104374 | A1 | 5/2006 | Frederiksen et al. |
| 2006/0195752 | A1 | 8/2006 | Walker et al. |
| 2007/0140377 | A1 | 6/2007 | Murakami et al. |
| 2007/0220151 | A1 | 9/2007 | Li et al. |
| 2008/0170530 | A1 | 7/2008 | Connors et al. |
| 2008/0186935 | A1 | 8/2008 | Ling et al. |
| 2008/0291860 | A1 | 11/2008 | Vijayan et al. |
| 2009/0046694 | A1 | 2/2009 | Matsumoto et al. |
| 2009/0135924 | A1 | 5/2009 | Fukuoka et al. |
| 2009/0149187 | A1 | 6/2009 | Miki et al. |
| 2009/0175230 | A1 | 7/2009 | Callard et al. |
| 2009/0175231 | A1 | 7/2009 | Seo et al. |
| 2009/0185638 | A1 | 7/2009 | Imamura et al. |
| 2009/0201902 | A1 | 8/2009 | Miki et al. |
| 2009/0247163 | A1 | 10/2009 | Aoyama |
| 2009/0310476 | A1 | 12/2009 | Seo et al. |
| 2010/0046459 | A1 | 2/2010 | Nishio et al. |
| 2010/0118800 | A1 | 5/2010 | Kim et al. |
| 2010/0165926 | A1 | 7/2010 | Fukuoka et al. |
| 2010/0309873 | A1 | 12/2010 | Nishio et al. |
| 2011/0044412 | A1 | 2/2011 | Murakami et al. |
| 2011/0051672 | A1* | 3/2011 | Lee ........................ H04W 72/04 370/329 |
| 2011/0268082 | A1 | 11/2011 | Nishio et al. |
| 2011/0275398 | A1 | 11/2011 | Nishio et al. |
| 2011/0317546 | A1 | 12/2011 | Zhang et al. |
| 2012/0106479 | A1 | 5/2012 | Nishio et al. |
| 2012/0147989 | A1 | 6/2012 | Murakami et al. |
| 2013/0315199 | A1 | 11/2013 | Nishio et al. |
| 2014/0233487 | A1 | 8/2014 | Nishio et al. |
| 2015/0333875 | A1 | 11/2015 | Zhang et al. |

FOREIGN PATENT DOCUMENTS

| | | |
|---|---|---|
| EP | 1928113 A1 | 6/2008 |
| EP | 1933490 A1 | 6/2008 |
| EP | 2077650 A2 | 7/2009 |
| JP | H08191289 A | 7/1996 |
| JP | 2006311465 A | 11/2006 |
| WO | WO 0230009 A1 | 4/2002 |
| WO | WO 2005050885 A1 | 6/2005 |
| WO | WO 2006082923 A1 | 8/2006 |
| WO | WO 2006137708 A1 | 12/2006 |
| WO | WO 2007018154 A1 | 2/2007 |
| WO | WO 2007052766 A1 | 5/2007 |
| WO | WO 2007055292 A1 | 5/2007 |

OTHER PUBLICATIONS

Chinese Search Report, dated Dec. 16, 2015, for Chinese Patent Application No. 2013103261437, 4 pages. (with English Translation).
Ericsson, NTT DoCoMo, "E-UTRA Downlink Control Signaling—Overhead Assessment," R1-060573, TSG-RAN WG1 #44, Agenda Item: 13.1.3, Denver, CO, USA, Feb. 13-17, 2006, 7 pages.
Extended European Search Report, dated Apr. 3, 2012, for corresponding European Application No. 12158789.3, 11 pages.
Extended European Search Report, dated Dec. 10, 2013, for corresponding European Patent Application No. 13192440.9 - 1851, 14 pages.
International Search Report, mailed Sep. 16, 2008, for International Patent Application No. PCT/JP2008/001569, filed Jun. 18, 2008.
LG Electronics, "DL control signaling for DVRB allocation using compact assignment," R1-081007, Agenda Item: 6.1.5, 3GPP TSG RAN WG1 #52, Sorrento, Italy, Feb. 11-15, 2008, 4 pages.
LG Electronics, "Downlink resource allocation for localized and distributed transmission," R1-071549, Agenda Item: 7.11.2, 3GPP TSG RAN WG1 #48bis, Malta, Mar. 26-30, 2007, 3 pages.

(56) References Cited

OTHER PUBLICATIONS

Motorola, "E-UTRA DL Distributed Multiplexing and Mapping Rules: Performance," R1-072687, 3GPP TSG RAN1 #49-bis, Orlando, USA, Jun. 25-29, 2007, 6 pages.

Motorola, "EUTRA Downlink Distributed Multiplexing and Mapping Rules," R1-071352, Agenda Item: 7.11.2, 3GPP TSG RAN1 #48bis, St. Julians, Malta, Mar. 20-26, 2007, 3 pages.

Motorola, "Way forward for mapping of DL distributed transmissions to physical resource blocks," R1-072163, 3GPP TSG RAN1 # 49, Kobe, Japan, May 7-11, 2007, 3 pages.

NEC Group, "Resrouce Allocation Signalling for E-UTRA," R1-060830, TSG-RAN WG1 #44Bis, Agenda Item: 10.1.1, Athens, Greece, Mar. 27-31, 2006, 14 pages.

Nortel, "DVRB mapping," R1-080377, 3GPP TSG-RAN 1 Meeting #51-bis, Sevilla, Spain, Jan. 14-18, 2008, 2 pages.

Nortel, "Further discussion on the DVRB mapping scheme," R1-080772, Agenda Item: 6.1.5, 3GPP TSG-RAN 1 Meeting #52, Sorrento, Italy, Feb. 11-15, 2008, 2 pages.

Nortel, "The Multiplexing scheme for downlink resource block: distributed transmission and localized transmission," R1-072377, 3rd Generation Partnership Project, TSG RAN WG1 Meeting #49, Kobe, Japan, May 7-11, 2007, 6 pages.

Notice of Reasons for Rejection, mailed Mar. 16, 2010, for Japanese Patent Application No. 2009-241728, 2 pages.

NTT DoCoMo, Ericsson, Fujitsu, Mitsubishi Electric, Motorola, NEC, Nokia, Panasonic, Sharp, Toshiba Corporation, "Distributed FDMA Transmission for Shared Data Channel in E-UTRA Downlink," R1-061921 (Original R1-061182), Agenda Item: 6.3.1, 3GPP TSG RAN WG1 LTE Ad Hoc, Cannes, France, Jun. 27-30, 2006, 15 pages.

NTT DoCoMo, Ericsson, Fujitsu, Mitsubishi Electric, NEC, Nokia, Panasonic, Sharp, Toshiba Corporation, "Distributed FDMA Transmission for Shared Data Channel in E-UTRA Downlink," R1-060305, Agenda Item: 13.1.3, 3GPP TSG-RAN WG1 Meeting #44, Denver, USA, Feb. 13-17, 2006. (15 pages).

NTT DoCoMo, Fujitsu, KDDI, Mitsubishi Electric, NEC, Panasonic, Sharp, Toshiba Corporation, "RB-level Distributed Transmission Method for Shared Data Channel in E- Utra Downlink," R1-063318 (Original R1-062285), 3GPP TSG RAN WG1 Meeting # 47, Riga, Latvia, Nov. 6-10, 2006, 4 pages.

NTT DoCoMo, Fujitsu, Kddi, NEC, Panasonic, Sharp, Toshiba Corporation," Comparison between RB-level and Sub-carrier-level Distributed Transmission for Shared Data Channel in E-UTRA Downlink," R1-072431 (Original R1-061182), 3GPP TSG RAN WG1 LTE Meeting, Kobe, Japan, May 7-11, 2007, 13 pages.

Office Action, dated Feb. 2, 2012, for Russian Patent Application No. 2009147284/07(067361), 7 pages. (with English Translation).

Panasonic, "DL, DVRD to PRB mapping," R1-080977, 3GPP TSG-RAN WG1 Meeting #52, Sorrento, Italy, Feb. 11-15, 2008, 3 pages.

Philips, "Further discussion of Resource Block Mapping for E-UTRA Downlink," R1-072393, 3rd Generation Partnership Project, TSG RAN WG1 Meeting #49, Kobe, Japan, May 7-11, 2007, 4 pages.

QUALCOMM Europe, "E-UTRA Downlink Multiplexing and Control," R1-060169, Agenda Item: 5.1.2.3, 3GPP TSG RAN WG1 LTE Ad Hoc, Helsinki, Finland, Jan. 23-25, 2006, 5 pages.

Samsung, "Text proposal on Downlink data multiplexing," R1-061335, 3rd Generation Partnership Project, RAN WG1 Meeting #45, Shanghai, China, May 8-12, 2006, 3 pages.

Summons to attend oral proceedings pursuant to Rule 115(1) EPC, dated Feb. 25, 2013, for corresponding European Application No. 08776722.4-1851/2169855, 8 pages.

Summons to attend oral proceedings pursuant to Rule 115(1) EPC, dated Feb. 25, 2013, for corresponding European Application No. 12158789.3-1851/2464042, 7 pages.

Supplementary European Search Report, dated Nov. 2, 2011, for corresponding EP Patent Application No. 08776722.4, 10 pages.

Translation of Chinese Search Report, dated Oct. 26, 2015, for Chinese Patent Application No. 2013103254448, 2 pages.

Wengerter et al., "Fairness and Throughput Analysis for Generalized Proportional Fair Frequency Scheduling in OFDMA," Proceedings of IEEE 61st Vehicular Technology Conference (VTC 2005-Spring), Stockholm, May 30-Jun. 1, 2005, vol. 3, 5 pages.

Zte, "Physical downlink shared channel (PDSCH) construction in LTE EUTRAN," R1- 070675, 3rd Generation Partnership Project, TSG-RAN WG1 Meeting #48, St. Louis, MO, Feb. 12-16, 2007, 3 pages.

Nortel, Panasonic, LGE, "Way Forward on DVRB to PRB index mapping," R1-081113, 3GPP RAN WG1 #52, Sorrento, Italy, Feb. 11-15, 2008. (4 pages).

* cited by examiner

RECEIVING APPARATUS AND METHOD THEREOF

TECHNICAL FIELD

The present invention relates to a channel arrangement method and radio communication base station apparatus in multicarrier communications.

BACKGROUND ART

In recent years, various kinds of information apart from speech, such as images and data, have come to be transmitted in radio communications, and particularly in mobile communications. With the demand for still higher-speed transmission expected to continue to grow in the future, there is a need for a radio transmission technology that achieves high transmission efficiency through more efficient use of limited frequency resources in order to perform high-speed transmission.

One radio transmission technology capable of meeting such a need is OFDM (Orthogonal Frequency Division Multiplexing). OFDM is a multicarrier transmission technology that performs parallel transmission of data using a plurality of subcarriers, and is known for such features as high frequency efficiency and reduced inter-symbol interference in a multipath environment, and for its effectiveness in improving transmission efficiency.

Studies have been carried out into performing frequency scheduling transmission and frequency diversity transmission when this OFDM is used in a downlink, and data for transmission to a plurality of radio communication mobile station apparatuses (hereinafter referred to simply as mobile stations) is frequency-domain-multiplexed on a plurality of subcarriers.

In frequency scheduling transmission, a radio communication base station apparatus (hereinafter referred to simply as a base station) allocates subcarriers adaptively to mobile stations based on the received quality of each frequency band at each mobile station, enabling a maximum multi-user diversity effect to be obtained, and extremely efficient communication to be performed. Such frequency scheduling transmission is mainly suitable for data communication when a mobile station is moving at low speed, or for high-speed data communication. On the other hand, frequency scheduling transmission requires feedback of received quality information from each mobile station, and is therefore not suitable for data communication when a mobile station is moving at high speed. Frequency scheduling transmission is normally performed in transmission time units called subframes for individual Resource Blocks (RBs) in which a number of adjacent subcarriers are collected together into a block. A channel for performing this kind of frequency scheduling transmission is called a Localized Channel (hereinafter referred to as Lch).

In contrast, in frequency diversity transmission, data for each mobile station is allocated distributed among subcarriers of an entire band, enabling a high frequency diversity effect to be obtained. Also, frequency diversity transmission does not require received quality information from a mobile station, and is thus an effective method in circumstances in which use of frequency scheduling transmission is difficult, as described above. On the other hand, frequency diversity transmission is performed without regard to received quality at mobile stations, and therefore does not provide the kind of multi-user diversity effect obtained with frequency scheduling transmission. A channel for performing this kind of frequency diversity transmission is called a Distributed Channel (hereinafter referred to as Dch).

It is possible that frequency scheduling transmission in an Lch and frequency diversity transmission in a Dch may be performed simultaneously. That is to say, an RB used for an Lch and an RB used for a Dch may be frequency-domain-multiplexed on a plurality of subcarriers of one OFDM symbol. At this time, mapping between each RB and Lch, and mapping between each RB and Dch, are set in advance, and which RB is used as an Lch or a Dch is controlled in subframe units.

Another idea that has been studied is to further divide an RB used for a Dch into a plurality of subblocks, and form one Dch by means of a combination of different RB subblocks. At this time, a plurality of Dch's with consecutive channel numbers are mapped to a plurality of RBs that are consecutive in the frequency domain (see Non-Patent Document 1, for example).

Non-patent Document 1: R1-072431 "Comparison between RB-level and Sub-carrier-level Distributed Transmission for Shared Data Channel in E-UTRA Downlink"3GPP TSG RAN WG1 LTE Meeting, Kobe, Japan, 7-11 May 2007

DISCLOSURE OF INVENTION

Problems to be Solved by the Invention

Here, when a base station allocates a plurality of Dch's to one mobile station, allocating a plurality of Dch's with consecutive channel numbers can be considered. By this means, a mobile station can determine a Dch allocated to it by having only the first channel number and last channel number of consecutive channel numbers reported from the base station to the mobile station. Thus, control information for reporting a Dch allocation result can be reduced.

However, when a plurality of Dch's are allocated to one mobile station, it may be that, with a plurality of RBs in which Dch's with consecutive channel numbers are arranged, only subblocks within RBs to which those Dch's are allocated are used. Consequently, there is a possibility of communication resource utilization efficiency falling because the remaining subblocks other than the used subblocks are not used.

For example, if 12 RBs #1 through #12 that are consecutive in the frequency domain are each divided into two subblocks, and Dch #1 through #12 with consecutive channel numbers are mapped to RB #1 through #12, Dch #1 through #6 are mapped respectively to one subblock of RB #1 through #6, and Dch #7 through #12 are mapped respectively to the other subblock of RB #1 through #6. Similarly, Dch #1 through #6 are mapped respectively to one subblock of RB #7 through #12, and Dch #7 through #12 are mapped respectively to the other subblock of RB #7 through #12. By this means, Dch #1 is formed by an RB #1 subblock and RB #7 subblock. The above explanation can be applied to Dch #2 through #12.

Here, if Dch #1 through #6 are allocated to one mobile station, only one subblock corresponding to Dch #1 through #6 is used by RB #1 through #12, and the other subblock corresponding to Dch #7 through #12 is not used, with a resultant possibility of a fall in communication resource utilization efficiency.

It is an object of the present invention to provide a channel arrangement method and base station that can prevent a fall in utilization efficiency of a channel communication resource for performing frequency diversity transmission when simultaneously performing frequency scheduling transmission and frequency diversity transmission in multicarrier communication.

Means for Solving the Problem

A channel arrangement method of the present invention provides for a plurality of subcarriers forming a multicarrier signal to be divided into a plurality of resource blocks, and for a plurality of different distributed channels with consecutive channel numbers to be arranged in one resource block.

Advantageous Effects of Invention

According to the present invention, a fall in utilization efficiency of a channel communication resource for performing frequency diversity transmission can be prevented when simultaneously performing frequency scheduling transmission and frequency diversity transmission in multicarrier communication.

BEST MODE FOR CARRYING OUT THE INVENTION

Now, embodiments of the present invention will be described in detail with reference to the accompanying drawings.

Embodiment 1

Figure 1:
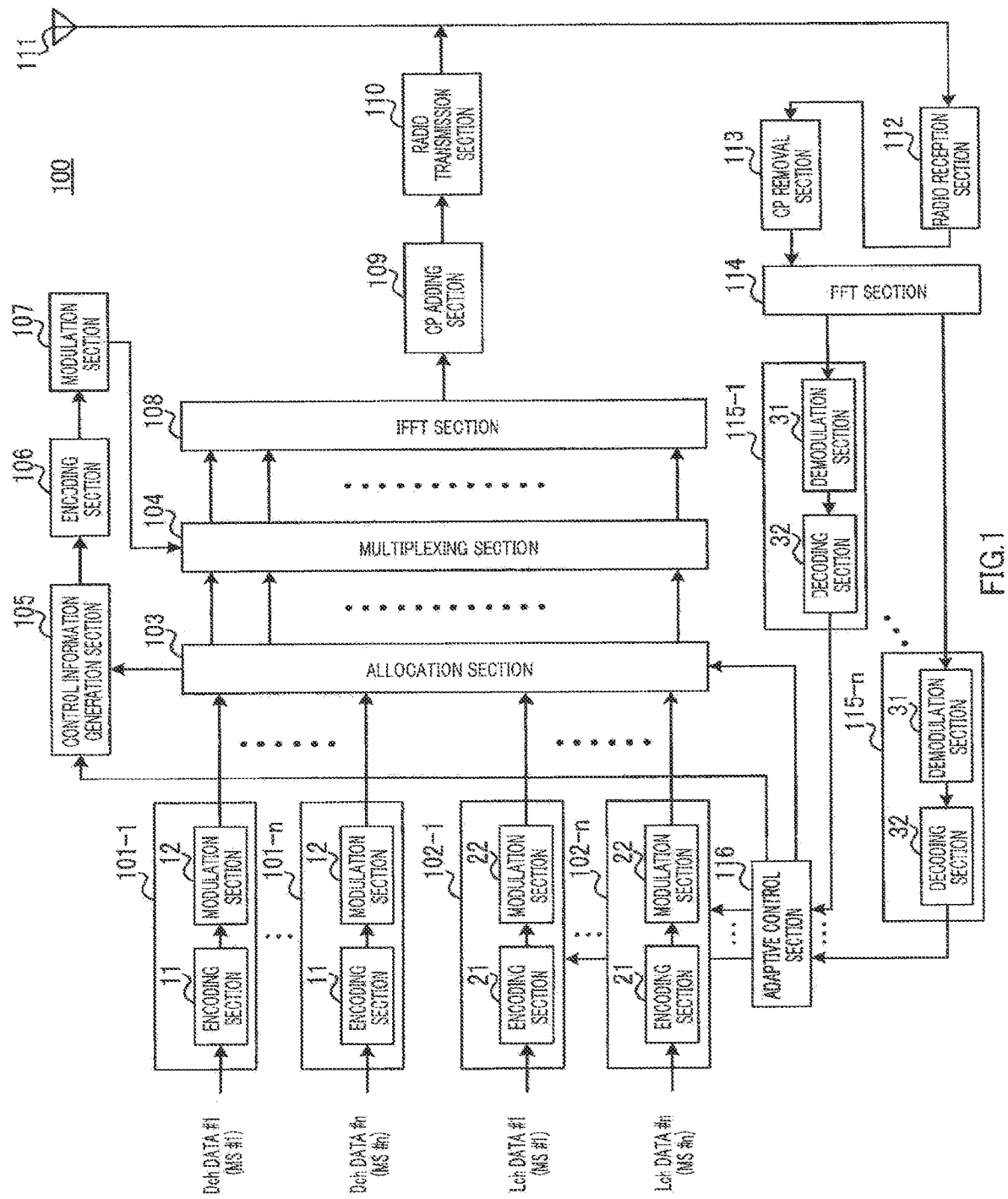
FIG. 1 is a block diagram showing a configuration of a base station according to Embodiment 1 of the present invention.

The configuration of base station 100 according to this embodiment is shown in FIG. 1. Base station 100 divides a plurality of subcarriers comprised of an OFDM symbol that is a multicarrier signal into a plurality of RBs, and uses a Dch and Lch on an RB-by-RB basis in that plurality of RBs. Also, either a Dch or an Lch is allocated to one mobile station in the same subframe.

Base station 100 is equipped with n encoding and modulation sections 101-1 through 101-n each comprising encoding section 11 and modulation section 12 for Dch data, n encoding and modulation sections 102-1 through 102-n each comprising encoding section 21 and modulation section 22 for Lch data, and n demodulation and decoding sections 115-1 through 115-n each comprising demodulation section 31 and decoding section 32, where n is a number of mobile stations (MSs) with which base station 100 can communicate.

In encoding and modulation sections 101-1 through 101-n, encoding section 11 performs turbo encoding or suchlike encoding processing on Dch data #1 through #n of mobile stations #1 through #n, and modulation section 12 performs modulation processing on post-encoding Dch data to generate a Dch data symbol.

In encoding and modulation sections 102-1 through 102-n, encoding section 21 performs turbo encoding or suchlike encoding processing on Lch data #1 through #n of mobile stations #1 through #n, and modulation section 22 performs modulation processing on post-encoding Lch data to generate an Lch data symbol. The coding rate and modulation scheme used at this time are in accordance with MCS (Modulation and Coding Scheme) information input from adaptive control section 116.

Allocation section 103 allocates a Dch data symbol and Lch data symbol to subcarriers comprised of an OFDM symbol in accordance with control from adaptive control section 116, and performs output to multiplexing section 104. At this time, allocation section 103 allocates a Dch data symbol and Lch data symbol collectively on an RB-by-RB basis. Also, when using a plurality of Dch's for a Dch data symbol of one mobile station, allocation section 103 uses Dch's with consecutive channel numbers. That is to say, allocation section 103 allocates a plurality of different Dch's with consecutive channel numbers to a Dch data symbol of one mobile station. In each RB, Dch and Lch arrangement positions are mutually mapped in advance. That is to say, allocation section 103 holds in advance an arrangement pattern constituting an association of a Dch, Lch, and RB, and allocates a Dch data symbol and Lch data symbol to each RB in accordance with the arrangement pattern. Dch arrangement methods according to this embodiment will be described in detail later herein. Allocation section 103 also outputs Dch data symbol allocation information (information indicating which mobile station's Dch data symbol has been allocated to which RB) and Lch data symbol allocation information (information indicating which mobile station's Lch data symbol has been allocated to which RB) to control information generation section 105. For example, only the first channel number and last channel number of consecutive channel numbers are included in Dch data symbol allocation information.

Control information generation section 105 generates control information comprising Dch data symbol allocation information, Lch data symbol allocation information, and MCS information input from adaptive control section 116, and outputs this control information to encoding section 106.

Encoding section 106 performs encoding processing on the control information, and modulation section 107 performs modulation processing on the post-encoding control information and outputs the control information to multiplexing section 104.

Multiplexing section 104 multiplexes control information with data symbols input from allocation section 103, and outputs the resulting signals to IFFT (Inverse Fast Fourier Transform) section 108. Control information multiplexing is performed on a subframe-by-subframe basis, for example. In this embodiment, either time domain multiplexing or frequency domain multiplexing may be used for control information multiplexing.

IFFT section 108 performs IFFT processing on a plurality of subcarriers comprising a plurality of RBs to which control information and a data symbol are allocated, to generate an OFDM symbol that is a multicarrier signal.

CP (Cyclic Prefix) adding section 109 adds a signal identical to the end part of an OFDM symbol to the start of the OFDM symbol as a CP.

Radio transmission section 110 performs transmission processing such as D/A conversion, amplification, and up-conversion on a post-CP-addition OFDM symbol, and transmits it to each mobile station from antenna 111.

Meanwhile, radio reception section 112 receives n OFDM symbols transmitted simultaneously from a maximum of n mobile stations via antenna 111, and performs reception processing such as down-conversion and A/D conversion on these OFDM symbols.

CP removal section 113 removes a CP from a post-reception-processing OFDM symbol.

FFT (Fast Fourier Transform) section 114 performs FFT processing on a post-CP-removal OFDM symbol, to obtain per-mobile-station signals multiplexed in the frequency domain. Here, mobile stations transmit signals using mutually different subcarriers or mutually different RBs, and per-mobile-station signals each include per-RB received quality information reported from the respective mobile station. Each mobile station can perform received quality measurement by means of a received SNR, received SIR, received SINR, received CINR, received power, interference power, bit error rate, throughput, an MCS that enables a predetermined error rate to be achieved, or the like. Received quality information may be expressed as a CQI (Channel Quality Indicator), CSI (Channel State Information), or the like.

In demodulation and decoding sections 115-1 through 115-n, each demodulation section 31 performs demodulation processing on a post-FFT signal, and each decoding section 32 performs decoding processing on a post-demodulation signal. By this means, received data is obtained. Received quality information within the received data is input to adaptive control section 116.

Adaptive control section 116 performs adaptive control on transmit data for Lch data based on per-RB received quality information reported from each mobile station. That is to say, based on per-RB received quality information, adaptive control section 116 performs selection of an MCS capable of satisfying a required error rate for encoding and modulation sections 102-1 through 102-n, and outputs MCS information. Also, adaptive control section 116 performs frequency scheduling that decides for allocation section 103 to which RB each of Lch data #1 through #n is allocated using a Max SIR method, Proportional Fairness method, or suchlike scheduling algorithm. Furthermore, adaptive control section 116 outputs per-RB MCS information to control information generation section 105.

Figure 2:
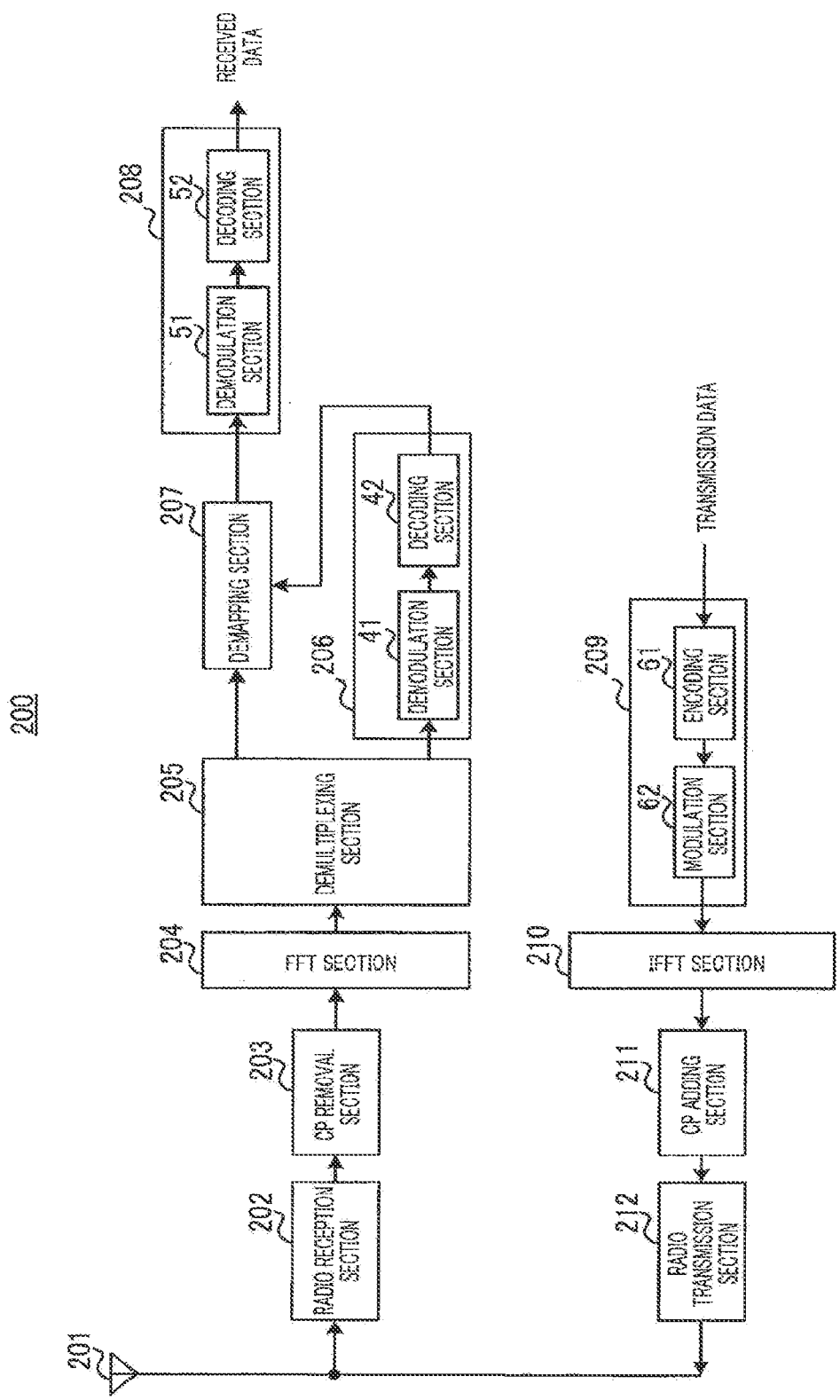
FIG. 2 is a block diagram showing a configuration of a mobile station according to Embodiment 1 of the present invention.

The configuration of mobile station 200 according to this embodiment is shown in FIG. 2. Mobile station 200 receives a multicarrier signal that is an OFDM symbol comprising a plurality of subcarriers divided into a plurality of RBs from base station 100 (FIG. 1). In the plurality of RBs, a Dch and Lch are used on an RB-by-RB basis. Also, in the same subframe, either a Dch or Lch is allocated to mobile station 200.

In mobile station 200, radio reception section 202 receives an OFDM symbol transmitted from base station 100 via antenna 201, and performs reception processing such as up-conversion and A/D conversion on the OFDM symbol.

CP removal section 203 removes a CP from a post-reception-processing OFDM symbol.

FFT section 204 performs FFT processing on a post-CP-removal OFDM symbol, to obtain a received signal in which control information and a data symbol are multiplexed.

Demultiplexing section 205 demultiplexes a post-FFT received signal into a control signal and data symbol. Then demultiplexing section 205 outputs the control signal to demodulation and decoding section 206, and outputs the data symbol to demapping section 207.

In demodulation and decoding section 206, demodulation section 41 performs demodulation processing on the control signal, and decoding section 42 performs decoding processing on the post-demodulation signal. Here, control information includes Dch data symbol allocation information, Lch data symbol allocation information, and MCS information. Then demodulation and decoding section 206 outputs Dch data symbol allocation information and Lch data symbol allocation information within the control information to demapping section 207.

Based on allocation information input from demodulation and decoding section 206, demapping section 207 extracts a data symbol allocated to that station from a plurality of RBs to which a data symbol input from demultiplexing section 205 has been allocated. In the same way as base station 100 (FIG. 1), Dch and Lch arrangement positions are mutually mapped in advance for each RB. That is to say, demapping section 207 holds in advance the same arrangement pattern as allocation section 103 of base station 100, and extracts a Dch data symbol and Lch data symbol from a plurality of RBs in accordance with the arrangement pattern. Also, as described above, when allocation section 103 of base station 100 (FIG. 1) uses a plurality of Dch's for a Dch data symbol of one mobile station, Dch's with consecutive channel numbers are used. Also, only the first channel number and last channel number of consecutive channel numbers are indicated in allocation information included in control information from base station 100. Thus, demapping section 207 identifies a Dch used in a Dch data symbol allocated to that station based on the first channel number and last channel number indicated in the allocation information. Then demapping section 207 extracts an RB mapped to the channel number of an identified Dch, and outputs a data symbol allocated to the extracted RB to demodulation and decoding section 208.

In demodulation and decoding section 208, demodulation section 51 performs demodulation processing on a data symbol input from demapping section 207, and decoding section 52 performs decoding processing on the post-demodulation signal. By this means, received data is obtained.

Meanwhile, in encoding and modulation section 209, encoding section 61 performs turbo encoding or suchlike encoding processing on transmission data, and modulation section 62 performs modulation processing on post-encoding transmission data to generate a data symbol. Here, mobile station 200 transmits transmission data using different subcarriers or different RBs from other mobile stations, and per-RB received quality information is included in the transmission data.

IFFT section 210 performs IFFT processing on a plurality of subcarriers comprising a plurality of RBs to which a data symbol input from encoding and modulation section 209 is allocated, to generate an OFDM symbol that is a multicarrier signal.

CP adding section 211 adds a signal identical to the end part of an OFDM symbol to the start of the OFDM symbol as a CP.

Radio transmission section 212 performs transmission processing such as D/A conversion, amplification, and up-conversion on a post-CP-addition OFDM symbol, and transmits it to base station 100 (FIG. 1) from antenna 201.

Next, Dch channel arrangement methods according to this embodiment will be described. In the following description, a case in which a plurality of subcarriers comprised of one OFDM symbol are divided equally among 12 RBs—RB #1 through #12—will be taken as an example. Also, Lch #1 through #12 and Dch #1 through #12 are formed by respective RBs, and a channel used by each mobile station is controlled by adaptive control section 116. The Lch configuration for RBs shown in FIG. 3 and the Dch configuration for RBs shown below are mutually assigned in advance by allocation section 103.

Figure 3:
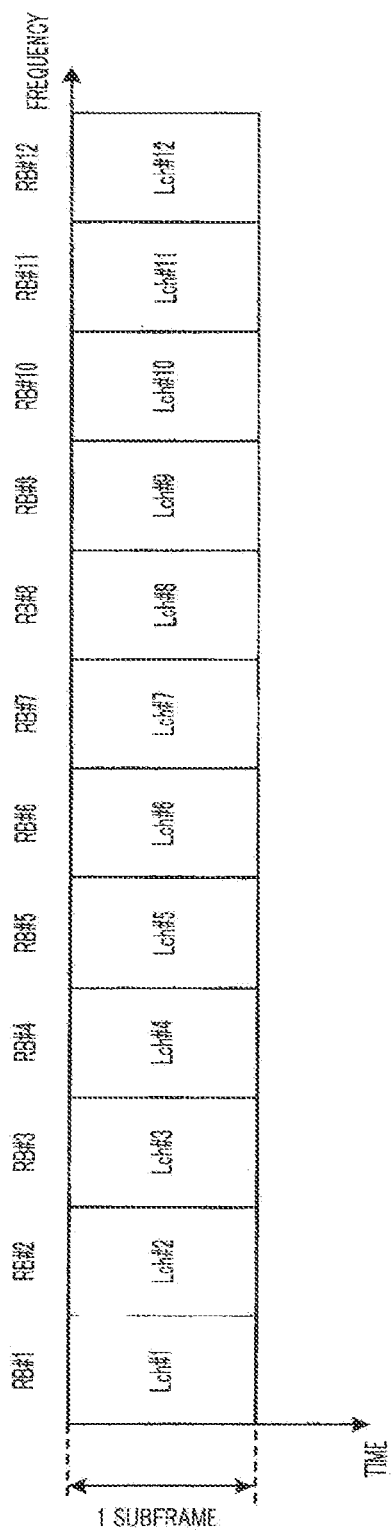
FIG. 3 shows an Lch arrangement method according to Embodiment 1 of the present invention.

Here, frequency scheduling for Lch's is performed in RB units, and therefore an Lch data symbol for one mobile station only is included in each RB used for an Lch. That is to say, one Lch for one mobile station is formed by one RB. Therefore, Lch #1 through #12 are arranged by means of RB #1 through #12 as shown in FIG. 3. That is to say, the allocation unit of each Lch is "1 RB×1 subframe."

On the other hand, frequency diversity transmission is performed for Dch's, and therefore a plurality of Dch data symbols are included in an RB used for a Dch. Here, each RB used for a Dch is time-divided into two subblocks, and a different Dch is arranged in each subblock. That is to say, a plurality of different Dch's are time-domain-multiplexed in one RB. Also, one Dch is formed by two different RB subblocks. That is to say, the allocation unit of each Dch is "(1 RB×½ subframe)×2," the same as the allocation unit of each Lch.

<Arrangement Method 1 (FIG. 4)>

With this arrangement method, Dch's with consecutive channel numbers are arranged in one RB.

First, a relational expression for a Dch channel number and the RB number of an RB in which that Dch is arranged will be shown.

When the number of subblock divisions per RB is Nd, RB number j of an RB in which Dch #(Nd·(k−1)+1), Dch #(Nd·(k−1)+2), . . . , Dch #(Nd·k) with consecutive channel numbers are arranged is given by Equation (1) below.

[1]

$$j=k+\text{floor}(Nrb/Nd)\cdot p, p=0,1,\cdots,Nd-1 \quad \text{(Equation 1)}$$

where k=1, 2, . . . , floor(Nrb/Nd), operator floor(x) represents the largest integer that does not exceed x, and Nrb is the number of RBs. Here, floor(Nrb/Nd) is the RB interval at which the same Dch is arranged.

That is to say, quantity Nd of Dch's comprising Dch #(Nd·(k−1)+1), Dch #(Nd·(k−1)+2), . . . , Dch #(Nd·k) that are arranged in the same RB and have consecutive channel numbers are distributively arranged in quantity Nd of RBs, RB #(j), separated by a floor(Nrb/Nd) RB interval, in the frequency domain.

Here, since Nrb=12 and Nd=2, above Equation (1) gives j=k+6·p (p=0, 1), where k=1, 2, . . . , 6. Thus, two Dch's with consecutive channel numbers, Dch #(2k−1) and Dch #(2k), are distributively arranged in two RBs, RB #(k) and RB #(k+6), separated by a 6 (=12/2) RB interval in the frequency domain.

Figure 4:
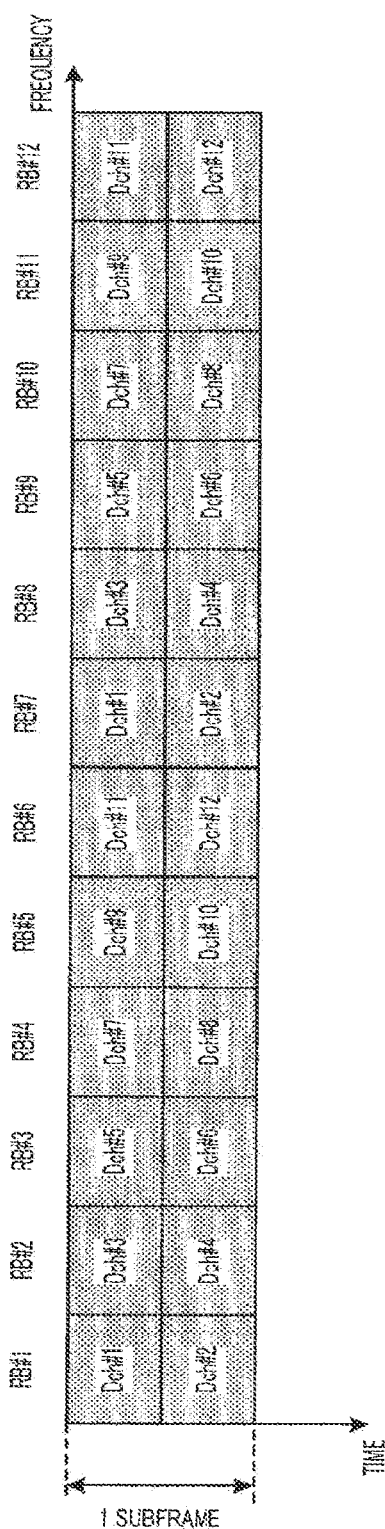
FIG. 4 shows a Dch arrangement method according to Embodiment 1 of the present invention (Arrangement Method 1: In case of division into two)

Specifically, as shown in FIG. 4, Dch #1 and #2 are arranged in RB #1 (RB #7), Dch #3 and #4 are arranged in RB #2 (RB #8), Dch #5 and #6 are arranged in RB #3 (RB #9), Dch #7 and #8 are arranged in RB #4 (RB #10), Dch #9 and #10 are arranged in RB #5 (RB #11), and Dch #11 and #12 are arranged in RB #6 (RB #12).

Figure 5:
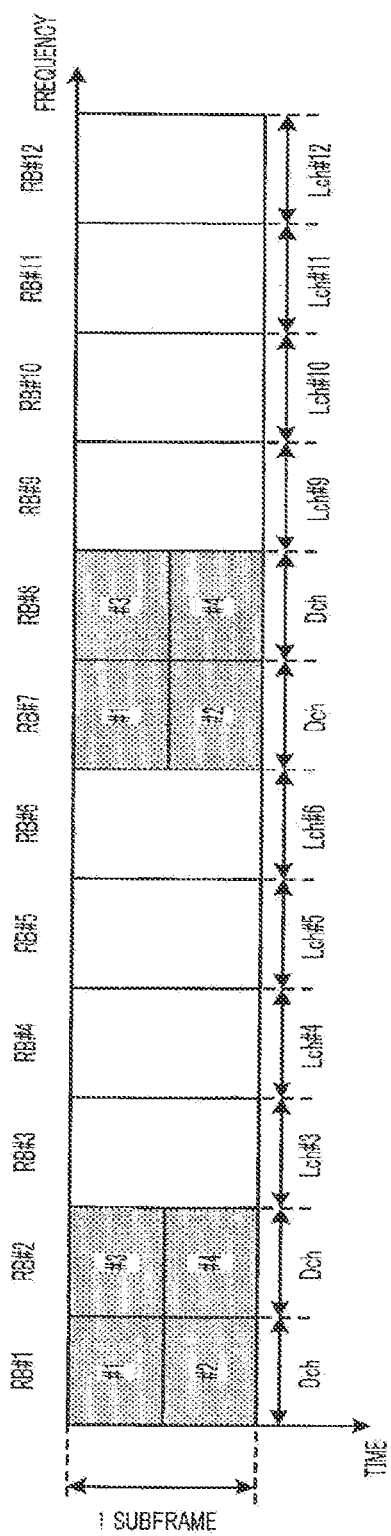
FIG. 5 shows an example of allocation according to Embodiment 1 of the present invention (Arrangement Method 1)

An example of allocation by allocation section 103 of base station 100 (FIG. 1) when four Dch's, Dch #1 through #4, are used for a Dch data symbol of one mobile station is shown in FIG. 5. Here, allocation section 103 holds the Dch arrangement pattern shown in FIG. 4, and allocates a Dch data symbol to RBs in accordance with the arrangement pattern shown in FIG. 4.

As shown in FIG. 5, allocation section 103 allocates a Dch data symbol to an RB #1 subblock and RB #7 subblock forming Dch #1, an RB #1 subblock and RB #7 subblock forming Dch #2, an RB #2 subblock and RB #8 subblock forming Dch #3, and an RB #2 subblock and RB #8 subblock forming Dch #4. That is to say, as shown in FIG. 5, a Dch data symbol is allocated to RB #1, #2, #7, #8.

Also, as shown in FIG. 5, allocation section 103 allocates an Lch data symbol to remaining RB #3 through #6 and RB #9 through #12 other than the RBs to which a Dch data symbol has been allocated. That is to say, Lch #3 through #6 and Lch #9 through #12 shown in FIG. 3 are used for an Lch data symbol.

Next, an example of extraction by demapping section 207 of mobile station 200 (FIG. 2) will be described for a case in which a Dch data symbol using four consecutive Dch's, Dch #1 through #4, is allocated to mobile station 200. Here, demapping section 207 holds the Dch arrangement pattern shown in FIG. 4, the same as allocation section 103, and extracts a Dch data symbol from a plurality of RBs in accordance with the arrangement pattern shown in FIG. 4. First channel number Dch #1 and last channel number Dch #4 are indicated in Dch data symbol allocation information reported to mobile station 200 from base station 100.

Since the Dch channel numbers indicated in the Dch data symbol allocation information are Dch #1 and Dch #4, demapping section 207 identifies the fact that Dch's used for a Dch data symbol addressed to that station are the four consecutive Dch's Dch #1 through #4. Then, following a similar procedure to allocation section 103, demapping section 207 extracts Dch #1 formed by an RB #1 subblock and RB #7 subblock, Dch #2 formed by an RB #1 subblock and RB #7 subblock, Dch #3 formed by an RB #2 subblock and RB #8 subblock, and Dch #4 formed by an RB #2 subblock and RB #8 subblock, as shown in FIG. 5. That is to say, demapping section 207 extracts a Dch data symbol allocated to RB #1, #2, #7, #8, as shown in FIG. 5, as a data symbol addressed to that station.

Thus, with this arrangement method, Dch's with consecutive channel numbers are arranged in one RB, and therefore when one mobile station uses a plurality of Dch's, all the subblocks of one RB are used, and then subblocks of another RB are used. By this means, it is possible to minimize the allocation of a data symbol to some subblocks among a plurality of subblocks forming one RB while other subblocks are not used. Therefore, according to this arrangement method, a fall in the resource utilization efficiency of a channel for performing frequency diversity transmission can be prevented when simultaneously performing frequency scheduling transmission in an Lch and frequency diversity transmission in a Dch. Also, according to this arrangement method, a fall in the utilization efficiency of an RB communication resource used for a Dch can be prevented, increasing the number of RBs that can be used for Lch's, and enabling frequency scheduling to be performed for more frequency bands.

Also, according to this arrangement method, when one mobile station uses a plurality of Dch's, a plurality of Dch's with consecutive channel numbers are arranged in RBs that are consecutive in the frequency domain. Consequently, RBs that can be used for Lch's—that is, remaining RBs other than RBs used by a Dch—are also consecutive in terms of frequency. For example, when frequency selectivity of a channel is moderate or when the bandwidth of each RB is narrow, RB bandwidth becomes narrow with respect to a frequency selective fading correlation bandwidth. At this time, RBs with good channel quality are consecutive in a frequency band with high channel quality. Therefore, when RB bandwidth becomes narrow with respect to a frequency selective fading correlation bandwidth, use of this arrangement method enables RBs that are consecutive in the frequency domain to be used for Lch's, enabling a frequency scheduling effect to be further improved.

Furthermore, according to this arrangement method, a plurality of Lch's with consecutive channel numbers can be allocated. Consequently, when a base station allocates a plurality of Lch's to one mobile station, it is sufficient for only the first channel number and last channel number of consecutive channel numbers to be reported to a mobile station from the base station. Therefore, control information for reporting an Lch allocation result can be reduced in the same way as when a Dch allocation result is reported.

Figure 6:
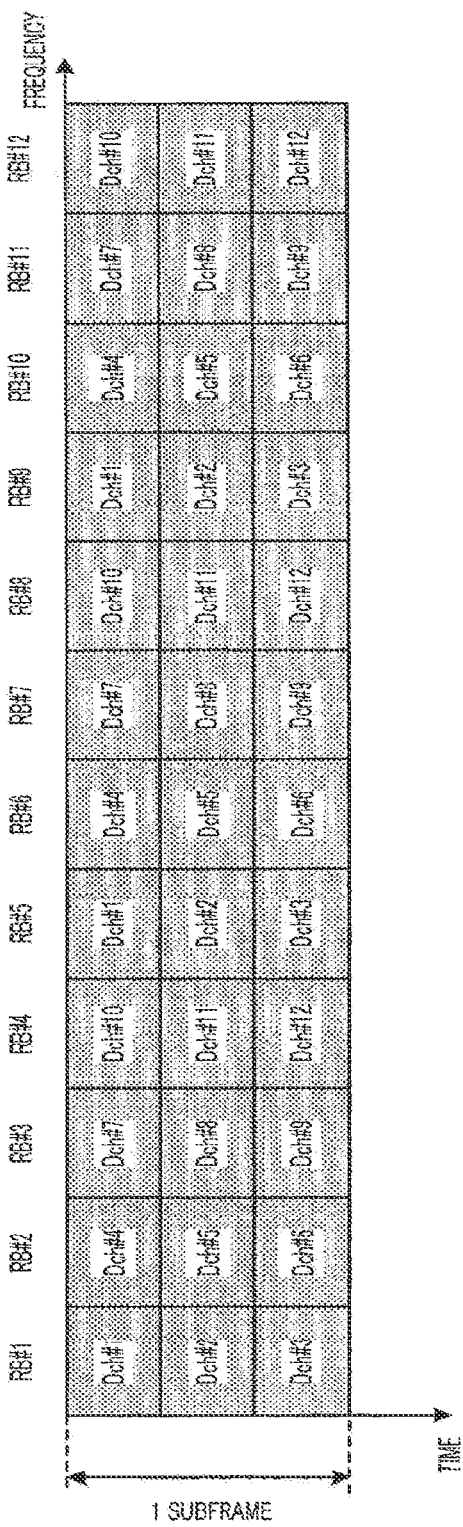
FIG. 6 shows a Dch arrangement method according to Embodiment 1 of the present invention (Arrangement Method 1: In case of division into three)

With this arrangement method, a case has been described in which one RB is divided into two when using Dch's, but the number of divisions of one RB is not limited to two, and one RB may also be divided into three or more divisions. For example, an allocation method for a case in which one RB is divided into three when using Dch's is shown in FIG. 6. As shown in FIG. 6, three consecutive Dch's are arranged in one RB, enabling the same kind of effect to be obtained as with this arrangement method. Also, since one Dch is formed by distribution among three RBs as shown in FIG. 6, a diversity effect can be improved to a greater extent than in the case of division into two.

<Arrangement Method 2 (FIG. 8)>

With this arrangement method, the fact that a plurality of different Dch's with consecutive channel numbers are arranged in one RB is the same as in Arrangement Method 1, but a difference from Arrangement Method 1 is that a lowest-numbered or highest-numbered Dch and a Dch with a consecutive channel number among the plurality of Dch's are arranged in the above-described one RB and RBs distributively arranged in the frequency domain.

With this arrangement method, as with Arrangement Method 1 (FIG. 4), Dch's with consecutive channel numbers are arranged in the same RB. That is to say, of Dch #1 through #12 shown in FIG. 8, (Dch #1, #2), (Dch #3, #4), (Dch #5, #6), (Dch #7, #8), (Dch #9, #10), and (Dch #11, #12) are Dch combinations each formed by the same RB.

Of the above plurality of combinations, combinations in which a lowest-numbered or highest-numbered Dch included in one combination and a Dch with a consecutive channel number are included are arranged in RBs distributed in the frequency domain. That is to say, (Dch #1, #2) and (Dch #3, #4) in which Dch #2 and Dch #3 with consecutive channel numbers are respectively included are arranged in different distributed RBs, (Dch #3, #4) and (Dch #5, #6) in which Dch #4 and Dch #5 with consecutive channel numbers are respectively included are arranged in different distributed RBs, (Dch #5, #6) and (Dch #7, #8) in which Dch #6 and Dch #7 with consecutive channel numbers are respectively included are arranged in different distributed RBs, (Dch #7, #8) and (Dch #9, #10) in which Dch #8 and Dch #9 with consecutive channel numbers are respectively included are arranged in different distributed RBs, and (Dch #9, #10) and (Dch #11, #12) in which Dch #10 and Dch #11 with consecutive channel numbers are respectively included are arranged in different distributed RBs.

Here, as with Arrangement Method 1, a relational expression for a Dch channel number and the RB number of an RB in which that Dch is arranged will be shown.

RB number j of an RB in which Dch #(Nd·(k−1)+1), Dch #(Nd·(k−1)+2), . . . , Dch #(Nd·k) with consecutive channel numbers included in combination k are arranged is given by Equation (2) below.

[2]

$$j=q(k)+\text{floor}(Nrb/Nd)\cdot p, p=0,1,\cdots,Nd-1 \qquad \text{(Equation 2)}$$

where q(k) is given by a 2-row×(floor(Nrb/Nd)/2)-column block interleaver. The number of rows of the block interleaver has been assumed to be 2, but may be any positive integer less than or equal to floor(Nrb/Nd). By this means, combination k and a combination in which a lowest-numbered or highest-numbered Dch included in combination k and a Dch with a consecutive channel number (combination k−1 or combination k+1) are arranged in distributed RBs with different RB numbers.

Figure 7:
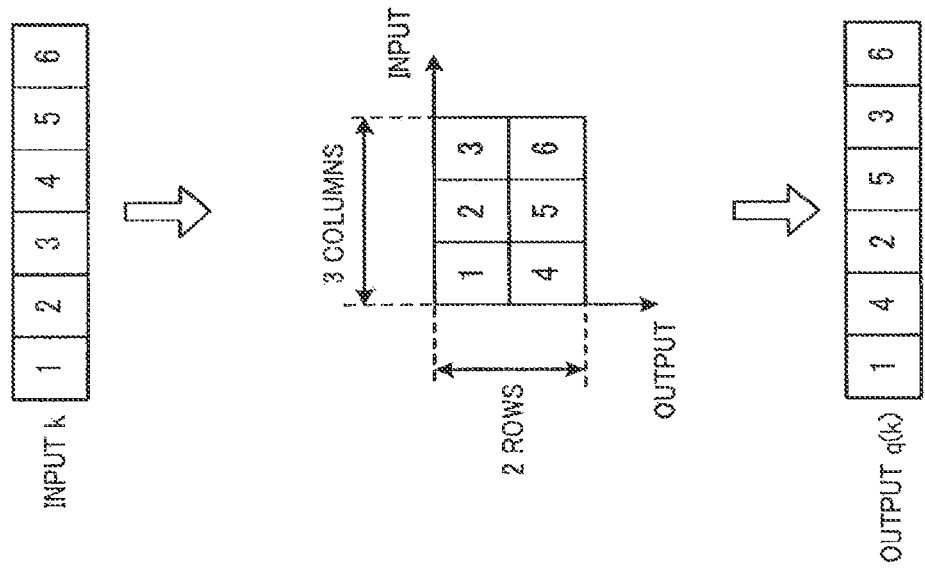
FIG. 7 is a drawing showing a block interleaver according to Embodiment 1 of the present invention (Arrangement Method 2)

Here, since Nrb=12 and Nd=2, above Equation (2) gives j-q(k)+6·p (p=0, 1), where q(k) is given by a 2-row×3-column block interleaver as shown in FIG. 7. That is to say, as shown in FIG. 7, q(k)=1, 4, 2, 5, 3, 6 is obtained for k=1, 2, 3, 4, 5, 6. Thus, two Dch's with consecutive channel numbers, Dch #(2k−1) and Dch #(2k), are distributively arranged in two RBs, RB #(q(k)) and RB #(q(k)+6), separated by a 6 (=12/2) RB interval in the frequency domain.

Figure 8:
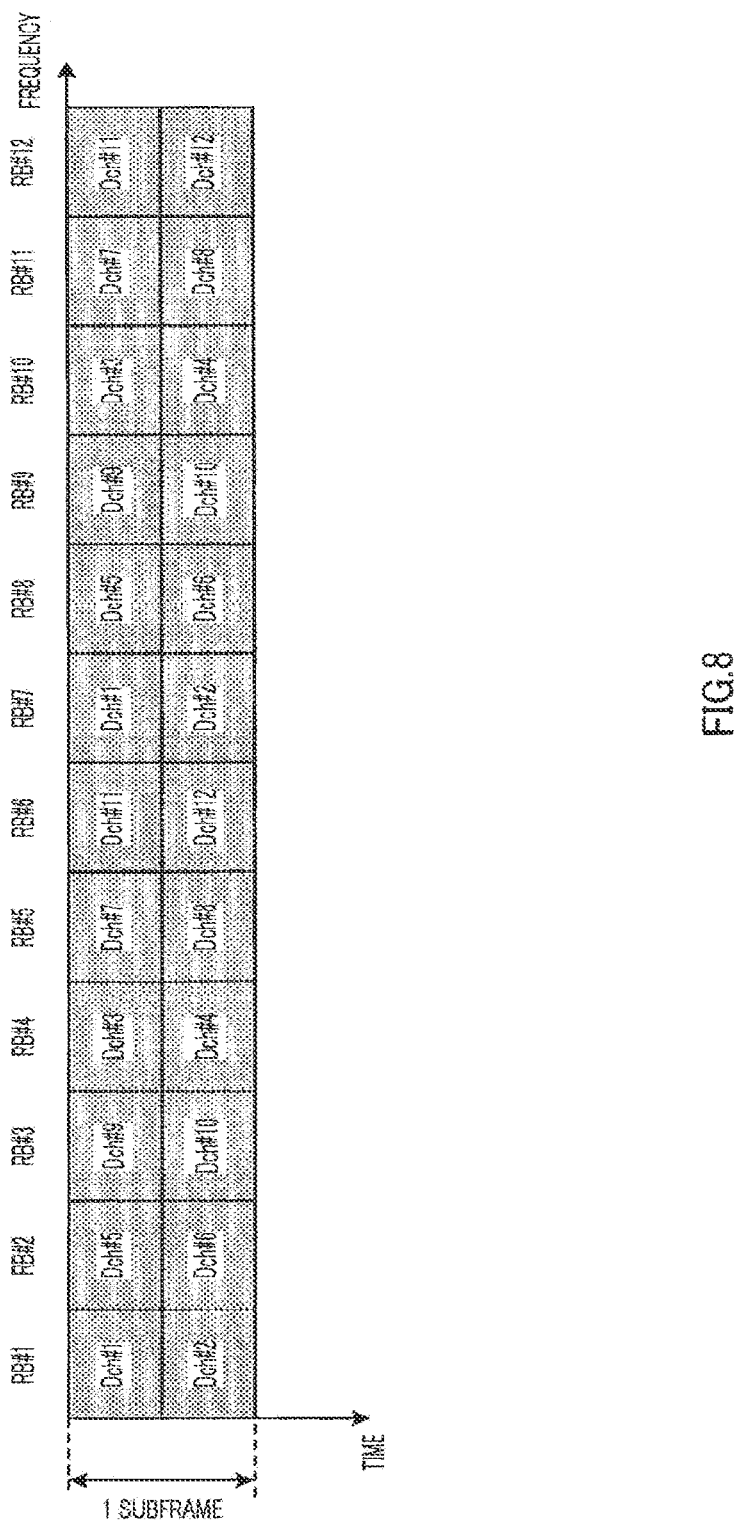
FIG. 8 shows a Dch arrangement method according to Embodiment 1 of the present invention (Arrangement Method 2: In case of division into two)

Specifically, for example, as shown in FIG. 8, Dch #1 and #2 are arranged in RB #1 (RB #7), Dch #5 and #6 are arranged in RB #2 (RB #8), Dch #9 and #10 are arranged in RB #3 (RB #9), Dch #3 and #4 are arranged in RB #4 (RB #10), Dch #7 and #8 are arranged in RB #5 (RB #11), and Dch #11 and #12 are arranged in RB #6 (RB #12).

Figure 9:
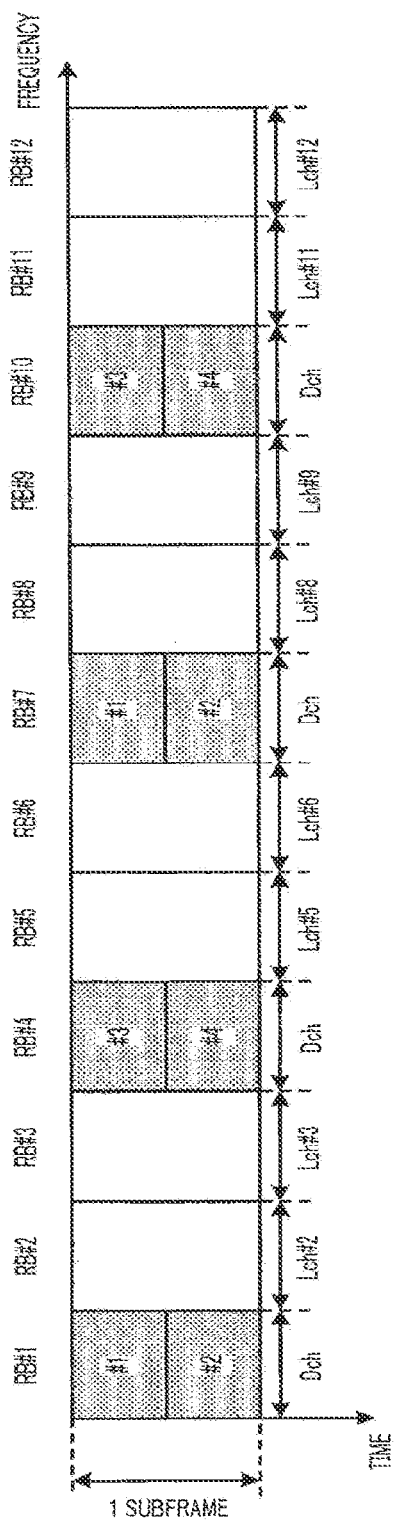
FIG. 9 shows an example of allocation according to Embodiment 1 of the present invention (Arrangement Method 2)

As with Arrangement Method 1, an example of allocation by allocation section 103 of base station 100 (FIG. 1) when four consecutive Dch's, Dch #1 through #4, are used for a Dch data symbol of one mobile station is shown in FIG. 9. Here, allocation section 103 holds the Dch arrangement pattern shown in FIG. 8, and allocates a Dch data symbol to RBs in accordance with the arrangement pattern shown in FIG. 8.

As shown in FIG. 9, allocation section 103 allocates a Dch data symbol to an RB #1 subblock and RB #7 subblock forming Dch #1, an RB #1 subblock and RB #7 subblock forming Dch #2, an RB #4 subblock and RB #10 subblock forming Dch #3, and an RB #4 subblock and RB #10 subblock forming Dch #4. That is to say, as shown in FIG. 9, a Dch data symbol is allocated to RB #1, #4, #7, #10.

Also, as shown in FIG. 9, allocation section 103 allocates an Lch data symbol to remaining RB #2, #3, #5, #6, #8, #9, #11, #12 other than the RBs to which a Dch data symbol has been allocated. That is to say, Lch #2, #3, #5, #6, #8, #9, #11, #12 shown in FIG. 3 are used for an Lch data symbol.

Next, as with Arrangement Method 1, an example of extraction by demapping section 207 of mobile station 200 (FIG. 2) will be described for a case in which a Dch data symbol using four consecutive Dch's, Dch #1 through #4, is allocated to mobile station 200. Here, demapping section 207 holds the Dch arrangement pattern shown in FIG. 8, the same as allocation section 103, and extracts a Dch data symbol from a plurality of RBs in accordance with the arrangement pattern shown in FIG. 8. As with Arrangement Method 1, first channel number Dch #1 and last channel number Dch #4 are indicated in Dch data symbol allocation information reported to mobile station 200 from base station 100.

Since the Dch channel numbers indicated in the Dch data symbol allocation information are Dch #1 and Dch #4, demapping section 207 identifies the fact that Dch's used for a Dch data symbol addressed to that station are the four consecutive Dch's Dch #1 through #4. Then, following a similar procedure to allocation section 103, demapping section 207 extracts Dch #1 formed by an RB #1 subblock and RB #7 subblock, Dch #2 formed by an RB #1 subblock and RB #7 subblock, Dch #3 formed by an RB #4 subblock and RB #10 subblock, and Dch #4 formed by an RB #4 subblock and RB #10 subblock, as shown in FIG. 9. That is to say, demapping section 207 extracts a Dch data symbol allocated to RB #1, #4, #7, #10, as shown in FIG. 9, as a data symbol addressed to that station.

With this arrangement method, as with Arrangement Method 1, a Dch data symbol is allocated to four RBs, and an Lch data symbol is allocated to eight RBs. However, with this arrangement method, a Dch data symbol is distributively allocated every three RBs, to RB #1, RB #4, RB #7, and RB #10, as shown in FIG. 9, enabling a frequency diversity effect to be improved to a greater extent than with Arrangement Method 1 (FIG. 5). Also, as shown in FIG. 9, having a Dch data symbol allocated to distributed RBs also means that an Lch data symbol is distributed, making it possible to perform frequency scheduling using RBs across a wider band.

Thus, with this arrangement method, a lowest-numbered or highest-numbered Dch and a Dch with a consecutive channel number among a plurality of different Dch's are arranged in one RB in which the plurality of different Dch's with consecutive channel numbers are arranged and RBs distributed in the frequency domain. Consequently, even if a plurality of Dch's are used for a data symbol of one mobile station, it is possible to prevent non-use of some RB subblocks, and allocate a data symbol distributed across a wide band. Therefore, according to this arrangement method, the same kind of effect can be obtained as with Arrangement Method 1, and furthermore, a frequency diversity effect can be improved. Also, with this arrangement method, RBs used for Dch's are distributed, enabling remaining RBs other than RBs used for Dch's—that is, RBs used for Lch's—to be distributed as well. As a result, according to this arrangement method a frequency scheduling effect can be improved.

Figure 10:
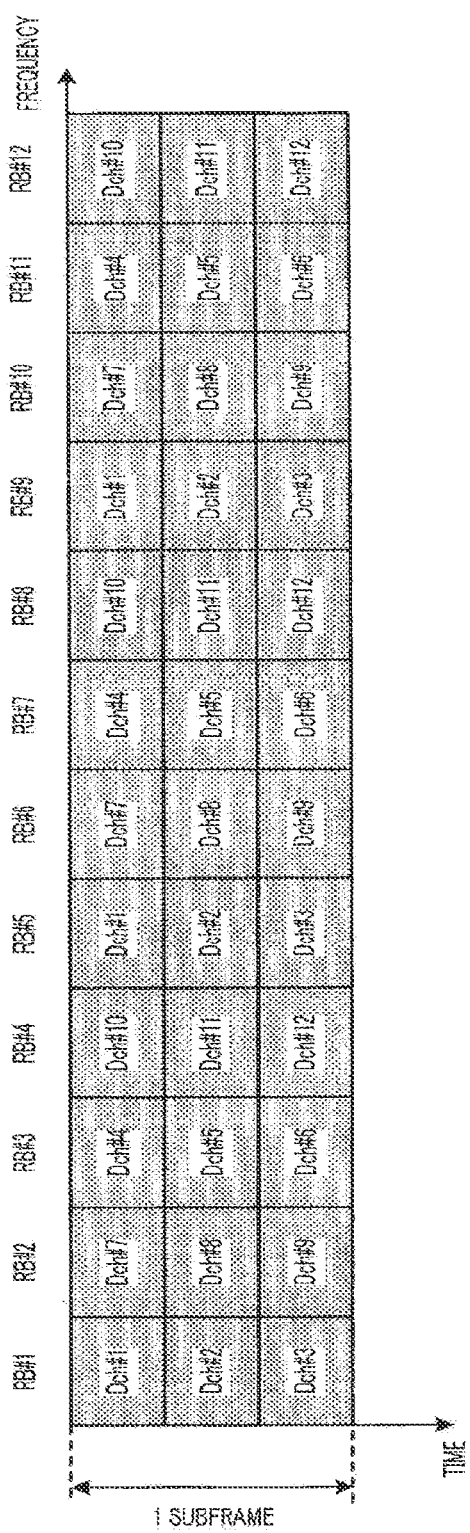
FIG. 10 shows a Dch arrangement method according to Embodiment 1 of the present invention (Arrangement Method 2: In case of division into three)

With this arrangement method, a case has been described in which one RB is divided into two when using Dch's, but the number of divisions of one RB is not limited to two, and one RB may also be divided into three or more divisions. For example, an allocation method for a case in which one RB is divided into three when using Dch's is shown in FIG. 10. As shown in FIG. 10, different RBs including consecutive Dch's are distributed in the frequency domain, enabling the same kind of effect to be obtained as with this arrangement method. Also, since one Dch is formed by distribution among three RBs as shown in FIG. 10, a diversity effect can be improved to a greater extent than in the case of division into two.

<Arrangement Method 3 (FIG. 11)>

With this arrangement method, Dch's with consecutive channel numbers are arranged in different RBs, and Dch's with channel numbers within a predetermined number are arranged in one RB.

This is described in concrete terms below. Here, the predetermined number is assumed to be 2. That is to say, the difference in channel numbers of mutually different Dch's included in the same RB does not exceed 2.

First, a relational expression for a Dch channel number and the RB number of an RB in which that Dch is arranged will be shown.

RB number j of an RB in which mutually different Dch's included in combination k are arranged is given by Equation (2), in the same way as with Arrangement Method 2. However, whereas with Arrangement Method 2 Dch channel numbers included in combination k are consecutive, with this arrangement method Dch channel numbers included in combination k are separated by a predetermined number. Also, combination number k is assigned a smaller value for a combination of Dch's with smaller channel numbers.

Here, since Nrb=12 and Nd=2, j=q(k)+6·p (p=0, 1) in the same way as with Arrangement Method 2, where q(k) is given by the 2-row×3-column block interleaver shown in FIG. 7, also as with Arrangement Method 2. Thus, Dch's included in combination k are distributively arranged in two RBs, RB #(q(k)) and RB #(q(k)+6), separated by a 6 (=12/2) RB interval in the frequency domain. However, since the predetermined number is 2, combination 1 (k=1) becomes (Dch #1, #3) and combination 2 (k=2) becomes (Dch #2, #4). The above explanation can be applied to combinations 3 through 6.

Figure 11:
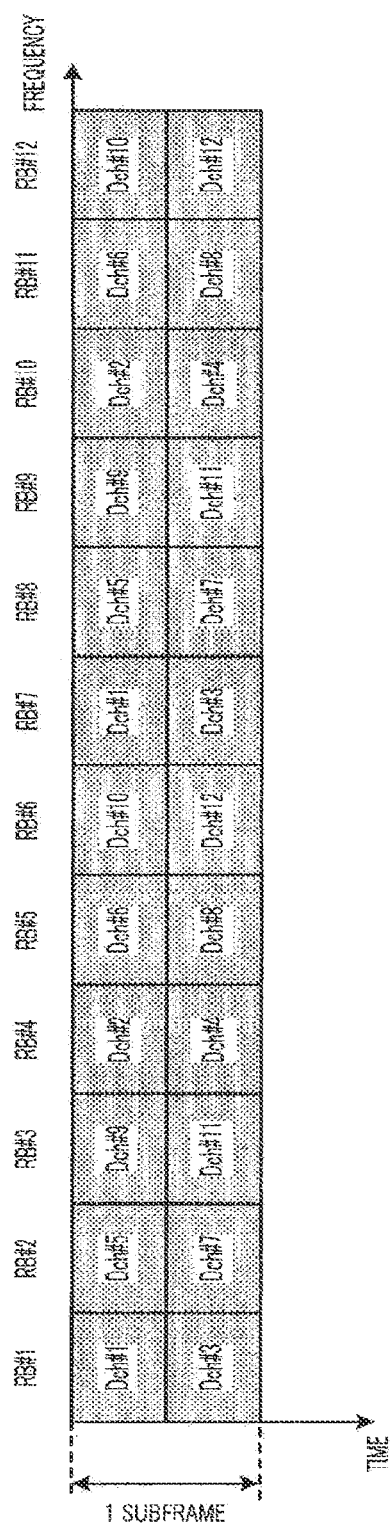
FIG. 11 shows a Dch arrangement method according to Embodiment 1 of the present invention (Arrangement Method 3: In case of division into two)

Therefore, as shown in FIG. 11, Dch #1 and #3 are arranged in RB #1 (RB #7), Dch #5 and #7 are arranged in RB #2 (RB #8), Dch #9 and #11 are arranged in RB #3 (RB #9), Dch #2 and #4 are arranged in RB #4 (RB #10), Dch #6 and #8 are arranged in RB #5 (RB #11), and Dch #10 and #12 are arranged in RB #6 (RB #12).

Figure 12:
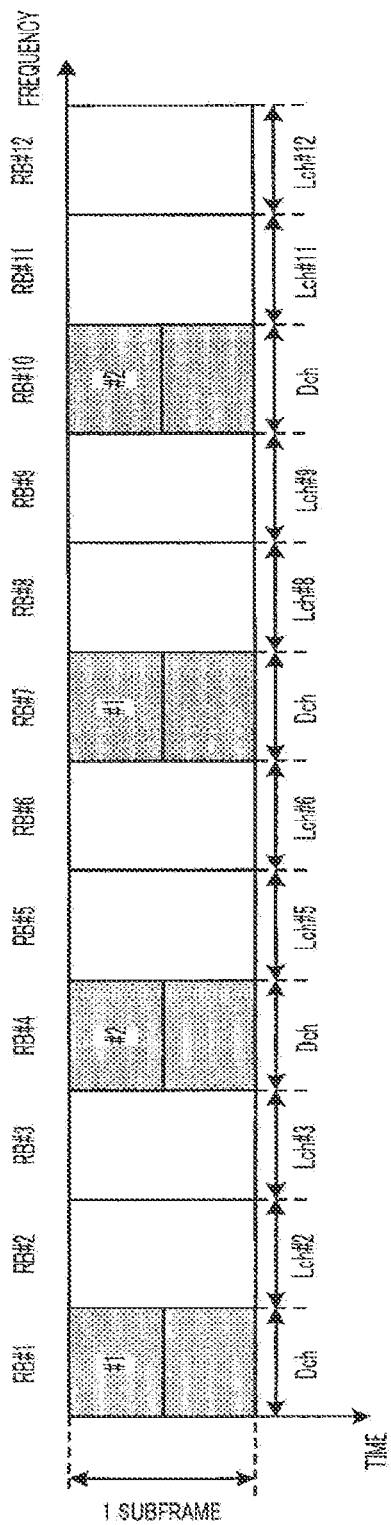
FIG. 12 shows an example of allocation according to Embodiment 1 of the present invention (Arrangement Method 3: Two Dch's)

An example of allocation by allocation section 103 of base station 100 (FIG. 1) when two consecutive Dch's, Dch #1 and #2, are used for a Dch data symbol of one mobile station—that is, when the number of Dch's used for a Dch data symbol of one mobile station is small—is shown in FIG. 12. Here, allocation section 103 holds the Dch arrangement pattern shown in FIG. 11, and allocates a Dch data symbol to RBs in accordance with the arrangement pattern shown in FIG. 11.

As shown in FIG. 12, allocation section 103 allocates a Dch data symbol to an RB #1 subblock and RB #7 subblock forming Dch #1, and an RB #4 subblock and RB #10 subblock forming Dch #2. That is to say, as shown in FIG. 12, a Dch data symbol is allocated to RB #1, #4, #7, #10 distributed in the frequency domain.

Next, an example of extraction by demapping section 207 of mobile station 200 (FIG. 2) will be described for a case in which a Dch data symbol using two consecutive Dch's, Dch #1 and #2, is allocated to mobile station 200. Here, demapping section 207 holds the Dch arrangement pattern shown in FIG. 11, the same as allocation section 103, and extracts a Dch data symbol from a plurality of RBs in accordance with the arrangement pattern shown in FIG. 11. First channel number Dch #1 and last channel number Dch #2 are indicated in Dch data symbol allocation information reported to mobile station 200 from base station 100.

Since the Dch channel numbers indicated in the Dch data symbol allocation information are Dch #1 and Dch #2, demapping section 207 identifies the fact that Dch's used for a Dch data symbol addressed to that station are the two consecutive Dch's Dch #1 and #2. Then, following a similar procedure to allocation section 103, demapping section 207 extracts Dch #1 formed by an RB #1 subblock and RB #7 subblock, and Dch #2 formed by an RB #4 subblock and RB #10 subblock, as shown in FIG. 12. That is to say, demapping section 207 extracts a Dch data symbol allocated to RB #1, #4, #7, #10 distributed in the frequency domain, as a data symbol addressed to that station.

Thus, when the number of Dch's used for a Dch data symbol of one mobile station is small—that is, when there are few allocated RBs—the effect of a fall in communication resource utilization efficiency for the entire band is small. Therefore, a frequency diversity effect can be obtained preferentially even though there is a possibility of subblocks other than subblocks allocated within RBs not being used.

Figure 13:
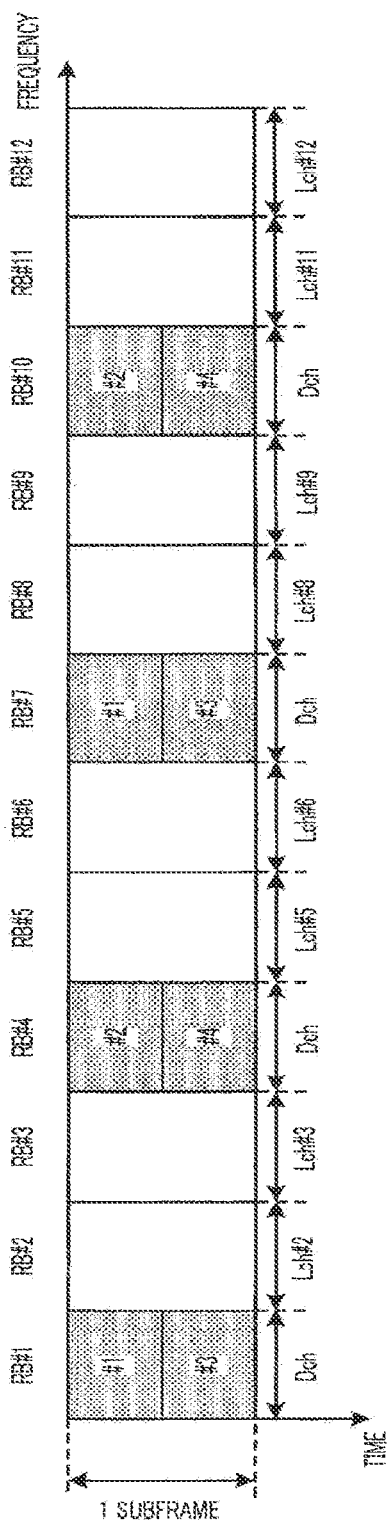
FIG. 13 shows an example of allocation according to Embodiment 1 of the present invention (Arrangement Method 3: Four Dch's)

On the other hand, an example of allocation by allocation section 103 of base station 100 (FIG. 1) when four consecutive Dch's, Dch #1 through #4, are used for a Dch data symbol of one mobile station—that is, when the number of Dch's used for a Dch data symbol of one mobile station is large—is shown in FIG. 13. Here, allocation section 103 holds the Dch arrangement pattern shown in FIG. 11, and allocates a Dch data symbol to RBs in accordance with the arrangement pattern shown in FIG. 11.

As shown in FIG. 13, allocation section 103 allocates a Dch data symbol to an RB #1 subblock and RB #7 subblock forming Dch #1, an RB #4 subblock and RB #10 subblock forming Dch #2, an RB #1 subblock and RB #7 subblock forming Dch #3, and an RB #4 subblock and RB #10 subblock forming Dch #4. That is to say, as shown in FIG. 13, a Dch data symbol is allocated to RB #1, #4, #7, #10, distributed in the frequency domain, in the same way as in FIG. 12. Also, in FIG. 13, a Dch data symbol is allocated to all the subblocks of RB #1, #4, #7, #10.

Next, an example of extraction by demapping section 207 of mobile station 200 (FIG. 2) will be described for a case in which a Dch data symbol using four consecutive Dch's, Dch #1 through #4, is allocated to mobile station 200. Here, demapping section 207 holds the Dch arrangement pattern shown in FIG. 11, the same as allocation section 103, and extracts a Dch data symbol from a plurality of RBs in accordance with the arrangement pattern shown in FIG. 11. First channel number Dch #1 and last channel number Dch #4 are indicated in Dch data symbol allocation information reported to mobile station 200 from base station 100.

Since the Dch channel numbers indicated in the Dch data symbol allocation information are Dch #1 and Dch #4, demapping section 207 identifies the fact that Dch's used for a Dch data symbol addressed to that station are the four consecutive Dch's Dch #1 through #4. Then, following a similar procedure to allocation section 103, demapping section 207 extracts Dch #1 formed by an RB #1 subblock and RB #7 subblock, Dch #2 formed by an RB #4 subblock and RB #10 subblock, Dch #3 formed by an RB #1 subblock and RB #7 subblock, and Dch #4 formed by an RB #4 subblock and RB #10 subblock, as shown in FIG. 13. That is to say, demapping section 207 extracts a Dch data symbol allocated to all the subblocks of RB #1, #4, #7, #10, as shown in FIG. 13, as a data symbol addressed to that station.

Thus, even when the number of Dch's used for a Dch data symbol of one mobile station is large—that is, when there are many allocated RBs—all subblocks within RBs can be used while obtaining a frequency diversity effect.

Thus, with this arrangement method, Dch's with consecutive channel numbers are arranged in different RBs, and Dch's with channel numbers within a predetermined number are arranged in one RB. By this means, a frequency diversity effect can be improved when the number of Dch's used for a Dch data symbol of one mobile station is small. Also, even when the number of Dch's used for a Dch data symbol of one mobile station is large, a frequency diversity effect can be improved without lowering communication resource utilization efficiency.

Figure 14:
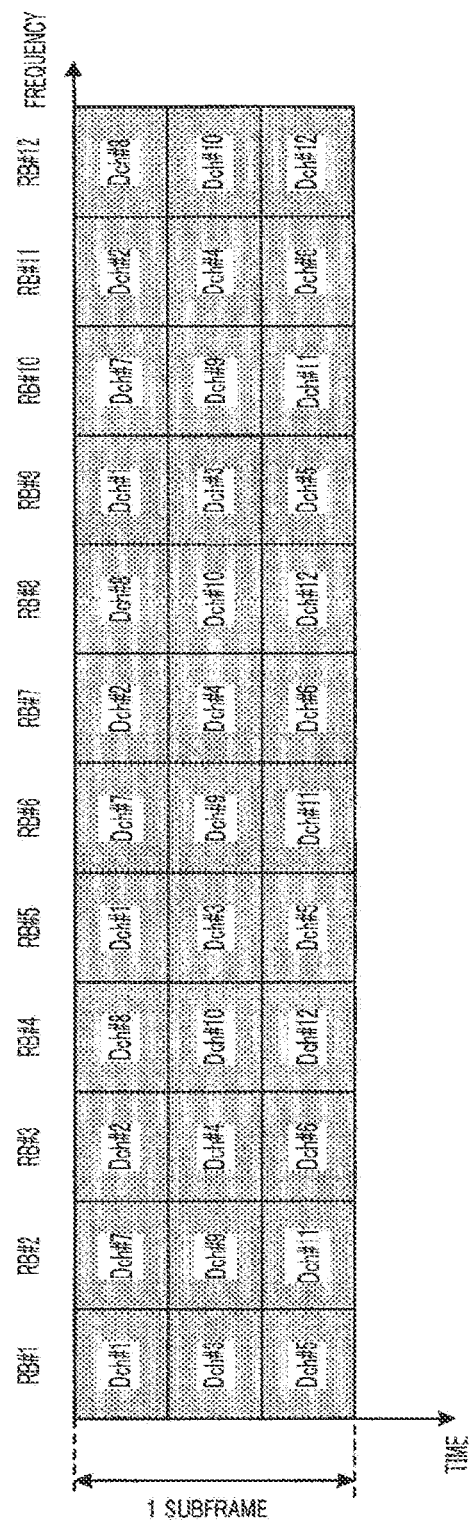
FIG. 14 shows a Dch arrangement method according to Embodiment 1 of the present invention (Arrangement Method 3: In case of division into three)

With this arrangement method, a case has been described in which one RB is divided into two when using Dch's, but the number of divisions of one RB is not limited to two, and one RB may also be divided into three or more divisions. For example, an allocation method for a case in which one RB is divided into three when using Dch's is shown in FIG. 14. As shown in FIG. 14, Dch's with consecutive channel numbers are arranged in different RBs, and Dch's with channel numbers within a predetermined number of 2 are arranged in one RB, enabling the same kind of effect to be obtained as with this arrangement method. Also, since one Dch is formed by distribution among three RBs as shown in FIG. 14, a diversity effect can be improved to a greater extent than in the case of division into two.

<Arrangement Method 4 (FIG. 15)>

With this arrangement method, the fact that a plurality of different Dch's with consecutive channel numbers are arranged in one RB is the same as in Arrangement Method 1, but a difference from Arrangement Method 1 is that RBs in which the same Dch is arranged are allocated in order from both ends of a band.

With this arrangement method, as with Arrangement Method 1 (FIG. 4), Dch's with consecutive channel numbers are arranged in the same RB. That is to say, of Dch #1 through #12 shown in FIG. 15, (Dch #1, #2), (Dch #3, #4), (Dch #5, #6), (Dch #7, #8), (Dch #9, #10), and (Dch #11, #12) are Dch combinations each formed by the same RB.

Figure 15:
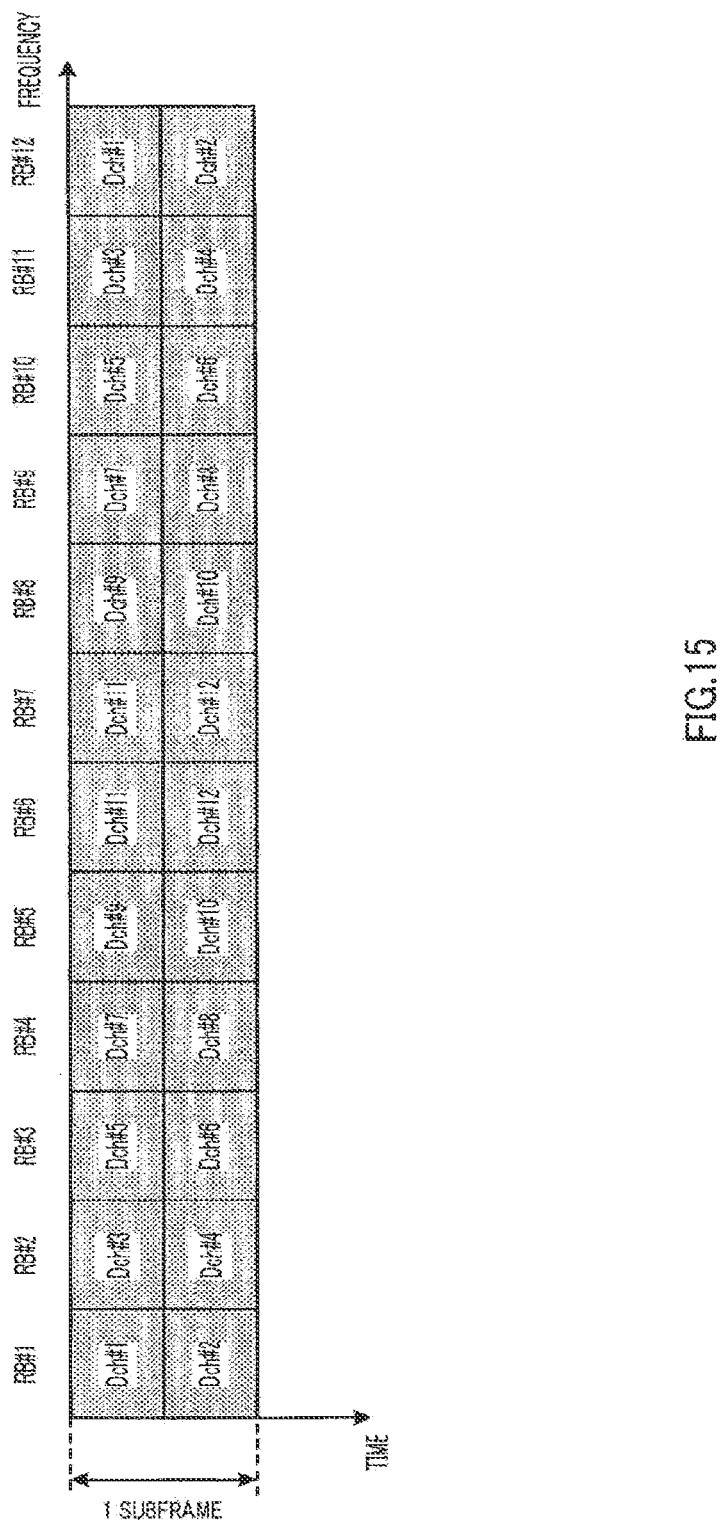
FIG. 15 shows a Dch arrangement method according to Embodiment 1 of the present invention (Arrangement Method 4: In case of division into two)

Two RBs in which Dch's of the above combinations are arranged are allocated in order from both ends of a band. That is to say, as shown in FIG. 15, combination (Dch #1, #2) is arranged in RB #1 and RB #12, and combination (Dch #3, #4) is arranged in RB #2 and RB #11. Similarly, (Dch #5, #6) is arranged in RB #3 and RB #10, (Dch #7, #8) is arranged in RB #4 and RB #9, (Dch #9, #10) is arranged in RB #5 and RB #8, and (Dch #11, #12) is arranged in RB #6 and RB #7.

Figure 16:
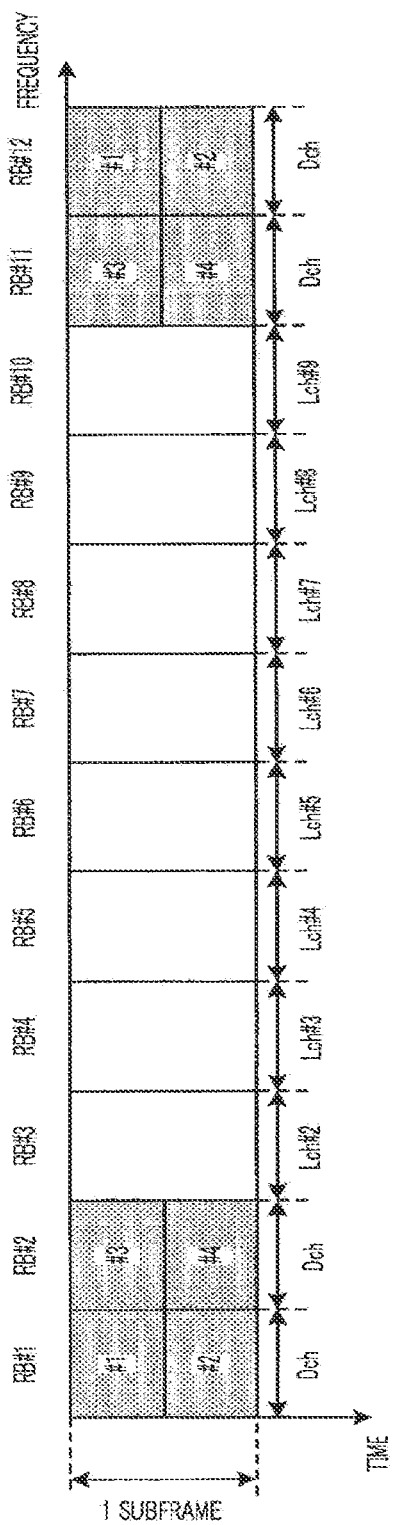
FIG. 16 shows an example of allocation according to Embodiment 1 of the present invention (Arrangement Method 4: Four Dch's)

As with Arrangement Method 1, an example of allocation by allocation section 103 of base station 100 (FIG. 1) when four consecutive Dch's, Dch #1 through #4, are used for a Dch data symbol of one mobile station is shown in FIG. 16. Here, allocation section 103 holds the Dch arrangement pattern shown in FIG. 15, and allocates a Dch data symbol to RBs in accordance with the arrangement pattern shown in FIG. 15.

As shown in FIG. 16, allocation section 103 allocates a Dch data symbol to an RB #1 subblock and RB #12 subblock forming Dch #1, an RB #1 subblock and RB #12 subblock forming Dch #2, an RB #2 subblock and RB #11 subblock forming Dch #3, and an RB #2 subblock and RB #11 subblock forming Dch #4. That is to say, as shown in FIG. 16, a Dch data symbol is allocated to RB #1, #2, #11, #12.

Also, as shown in FIG. 16, allocation section 103 allocates an Lch data symbol to remaining RB #3, #4, #5, #6, #7, #8, #9, #10 other than the RBs to which a Dch data symbol has been allocated. That is to say, Lch #3, #4, #5, #6, #7, #8, #9, #10 shown in FIG. 3 are used for an Lch data symbol.

Next, as with Arrangement Method 1, an example of extraction by demapping section 207 of mobile station 200 (FIG. 2) will be described for a case in which a Dch data symbol using four consecutive Dch's, Dch #1 through #4, is allocated to mobile station 200. Here, demapping section 207 holds the Dch arrangement pattern shown in FIG. 15, the same as allocation section 103, and extracts a Dch data symbol from a plurality of RBs in accordance with the arrangement pattern shown in FIG. 15. As with Arrangement Method 1, first channel number Dch #1 and last channel number Dch #4 are indicated in Dch data symbol allocation information reported to mobile station 200 from base station 100.

Since the Dch channel numbers indicated in the Dch data symbol allocation information are Dch #1 and Dch #4, demapping section 207 identifies the fact that Dch's used for a Dch data symbol addressed to that station are the four consecutive Dch's Dch #1 through #4. Then, following a similar procedure to allocation section 103, demapping section 207 extracts Dch #1 formed by an RB #1 subblock and RB #12 subblock, Dch #2 formed by an RB #1 subblock and RB #12 subblock, Dch #3 formed by an RB #2 subblock and RB #11 subblock, and Dch #4 formed by an RB #2 subblock and RB #11 subblock, as shown in FIG. 16. That is to say, demapping section 207 extracts a Dch data symbol allocated to RB #1, #2, #11, #12 as shown in FIG. 16, as a data symbol addressed to that station.

With this arrangement method, as with Arrangement Method 1 and Arrangement Method 2, a Dch data symbol is allocated to four RBs, and an Lch data symbol is allocated to eight RBs. However, with this arrangement method, a Dch data symbol is allocated to RBs at both ends of a band, as shown in FIG. 16. Since the RB interval at which a Dch data symbol is allocated is wider than in the case of Arrangement Method 1 (FIG. 5) or Arrangement Method 2 (FIG. 9), a frequency diversity effect can be improved. Also, as shown in FIG. 16, having a Dch data symbol allocated to RBs at both ends of a band also means that an Lch data symbol is distributed, making it possible to perform frequency scheduling using RBs across a wider band.

Also, according to this arrangement method, RBs that can be used for Lch's—that is, remaining RBs other than RBs used by a Dch—are all consecutive in terms of frequency. For example, when frequency selectivity of a channel is moderate or when the bandwidth of each RB is narrow, RB bandwidth becomes narrow with respect to a frequency selective fading correlation bandwidth. At this time, RBs with good channel quality are consecutive in a frequency band with high channel quality. Therefore, when RB bandwidth becomes narrow with respect to a frequency selective fading correlation bandwidth, use of this arrangement method enables RBs that are consecutive in the frequency domain to be used for Lch's, enabling a frequency scheduling effect to be further improved.

Furthermore, according to this arrangement method, a plurality of Lch's with consecutive channel numbers can be allocated. Consequently, when a base station allocates a plurality of Lch's to one mobile station, it is sufficient for only the first channel number and last channel number of consecutive channel numbers to be reported to a mobile station from the base station. With this arrangement method, all RBs that can be used for Lch's are consecutive in the frequency domain, and consequently even when all Lch's are allocated to one mobile station, enabling above reporting method to be used. Therefore, control information for reporting an Lch allocation result can be reduced in the same way as when a Dch allocation result is reported.

Figure 17:
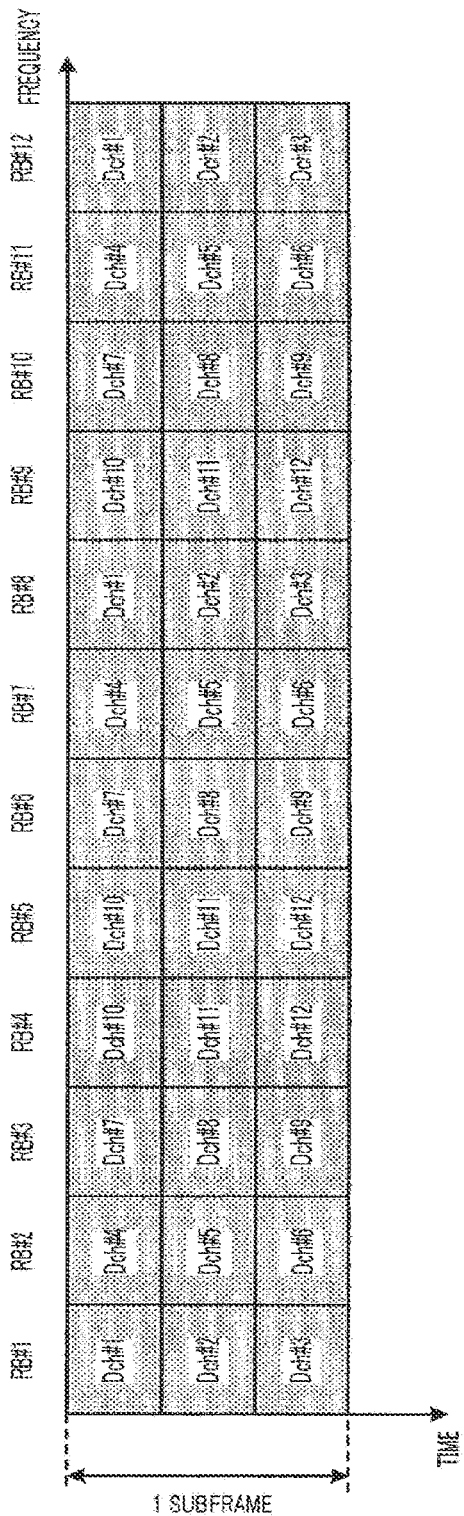
FIG. 17 shows a Dch arrangement method according to Embodiment 1 of the present invention (Arrangement Method 4: In case of division into three)
Figure 18:
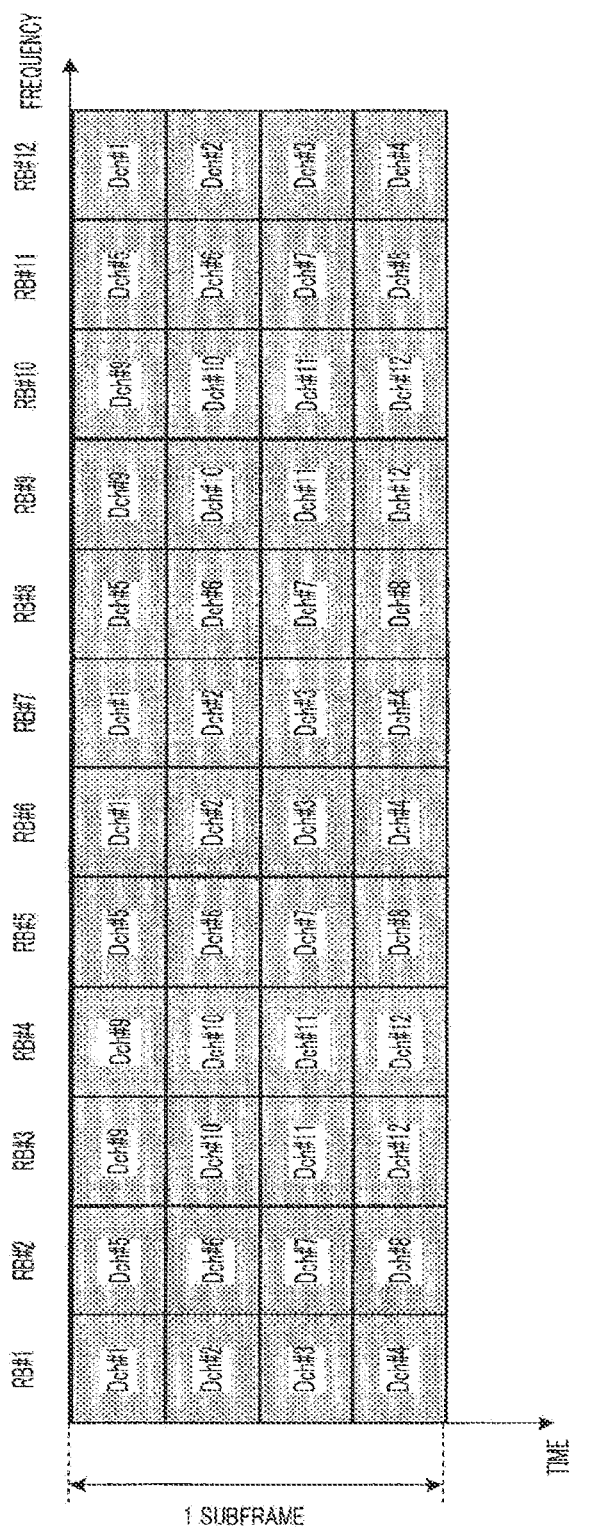
FIG. 18 shows a Dch arrangement method according to Embodiment 1 of the present invention (Arrangement Method 4: In case of division into four)

With this arrangement method, a case has been described in which one RB is divided into two when using Dch's, but the number of divisions of one RB is not limited to two, and one RB may also be divided into three or more divisions. For example, allocation methods for cases in which one RB is divided into three and into four when using Dch's are shown in FIG. 17 and FIG. 18 respectively. As shown in FIG. 17 and FIG. 18, different RBs including consecutive Dch's are arranged preferentially from both ends of a band, enabling the same kind of effect to be obtained as with this arrangement method. Also, since one Dch is formed by distribution among three RBs or four RBs as shown in FIG. 17 and FIG. 18 respectively, a diversity effect can be improved to a greater extent than in the case of division into two.

This concludes a description of Arrangement Methods 1 through 4 according to this embodiment.

Thus, according to this embodiment, a fall in the communication resource utilization efficiency of a channel for performing frequency diversity transmission can be prevented when simultaneously performing frequency scheduling transmission in an Lch and frequency diversity transmission in a Dch. Also, according to this embodiment, a fall in the utilization efficiency of an RB used for a Dch can be prevented, increasing the number of RBs that can be used for Lch's, and enabling frequency scheduling to be performed for more frequency bands.

Embodiment 2

In this embodiment a case will be described in which switching between use of Arrangement Method 1 and Arrangement Method 2 of Embodiment 1 is performed according to the communication environment.

As described above, Arrangement Method 1 enables more RBs consecutive in the frequency domain that can be used for Lch's to be secured than Arrangement Method 2, while Arrangement Method 2 has a greater frequency diversity effect than Arrangement Method 1.

Specifically, when four consecutive Dch's, Dch #1 through #4, are used for a Dch data symbol of one mobile station, with Arrangement Method 1 (FIG. 5) four RBs consecutive in the frequency domain, RB #3 through #6 and RB #9 through #12, can be used for an Lch, while a Dch data symbol is allocated to two RBs consecutive in the frequency domain, RB #1, #2 and RB #7, #8. On the other hand, with Arrangement Method 2 (FIG. 9) only two RBs consecutive in the frequency domain, RB #2, #3, RB #5, #6, RB #8, #9, and RB #11, #12, can be used for an Lch, while a Dch data symbol is distributively allocated every three RBs, to RB #1, #4, #7, #10.

Thus, with Arrangement Method 1 and Arrangement Method 2, there is a trade-off between a frequency diversity effect and the number of RBs consecutive in the frequency domain that can be used for Lch's.

Allocation section 103 according to this embodiment (FIG. 1) switches between Arrangement Method 1 and Arrangement Method 2 of Embodiment 1 according to the communication environment, and allocates a Dch data symbol and Lch data symbol to an RB respectively.

Next, Switching Methods 1 through 3 used by allocation section 103 of this embodiment will be described.
<Switching Method 1>

With this switching method, the arrangement method is switched according to the number of subblock divisions per RB. In the following description, the number of subblock divisions per RB is indicated by Nd.

Figure 19:
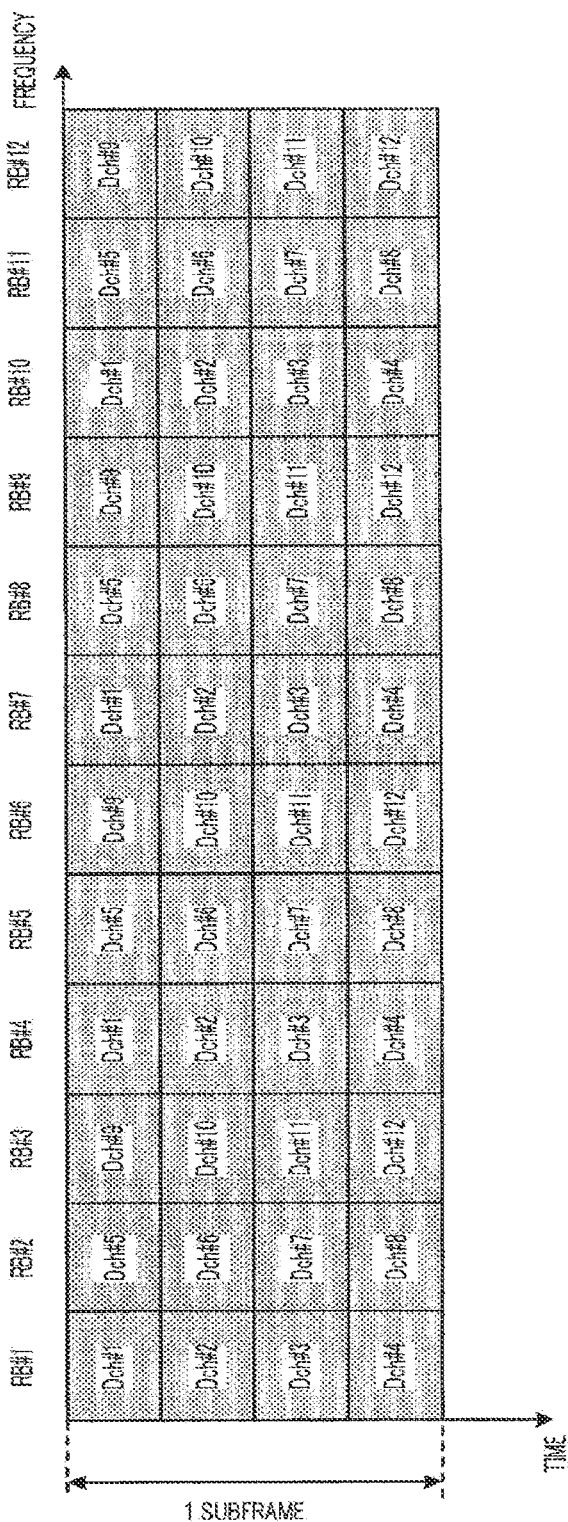
FIG. 19 shows a Dch arrangement method according to Embodiment 2 of the present invention (Switching Method 1)

The larger the value of Nd, the larger is the number of different RBs in which the same Dch is arranged. For example, with Arrangement Method 1, when Nd=2 the same Dch is distributively arranged in two different RBs as shown in FIG. 4, whereas when Nd=4 the same Dch is distributively arranged in four different RBs as shown in FIG. 19. Thus, the larger the value of Nd, the larger is the number of different RBs in which the same Dch is distributively arranged, and therefore the greater is the frequency diversity effect. In other words, the smaller the value of Nd, the smaller is the frequency diversity effect.

At the same time, the smaller the value of Nd, the larger is the frequency interval between different RBs in which the same Dch is arranged. For example, with Arrangement Method 1, when Nd=2 the frequency interval of subblocks forming the same Dch is six RBs as shown in FIG. 4, whereas when Nd=4 the frequency interval of subblocks forming the same Dch is three RBs. Thus, the smaller the value of Nd, the larger is the frequency interval of subblocks forming the same Dch, and correspondingly more RBs consecutive in terms of frequency can be secured for Lch's. In other words, the larger the value of Nd, the smaller is the number of RBs consecutive in the frequency domain that can be used for Lch's.

Thus, allocation section 103 allocates Dch's using Arrangement Method 1 when the value of Nd is large—that is, when the number of RBs consecutive in the frequency domain that can be used for Lch's is small—and allocates Dch's using Arrangement Method 2 when the value of Nd is small—that is, when the frequency diversity effect is small. Specifically, allocation section 103 performs arrangement method switching based on a comparison between Nd and a preset threshold value. That is to say, allocation section 103 switches to Arrangement Method 1 when Nd is greater than or equal to the threshold value, and switches to Arrangement Method 2 when Nd is less than the threshold value.

Figure 20:
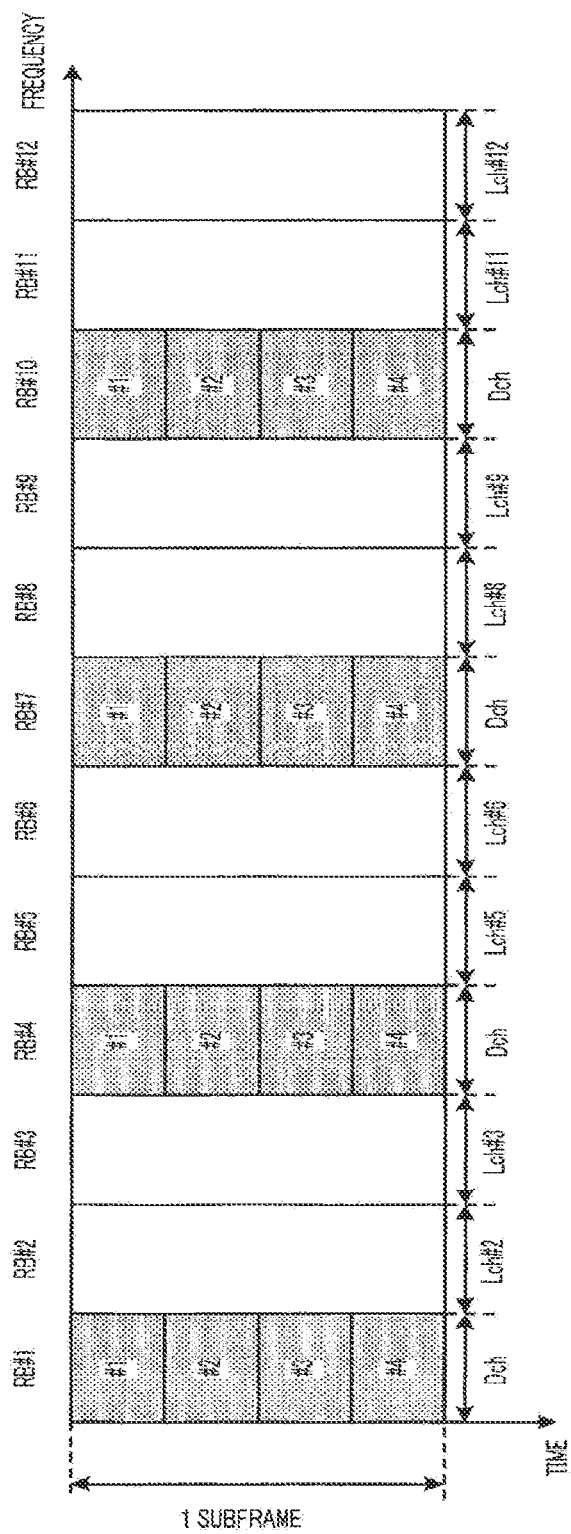
FIG. 20 shows an example of allocation according to Embodiment 2 of the present invention (Switching Method 1)

As in Embodiment 1, an example of allocation when four consecutive Dch's, Dch #1 through #4, are used for a Dch data symbol of one mobile station is shown in FIG. 20. Here, a case in which Nd=4 (when the number of divisions is large), and a case in which Nd=2 (when the number of divisions is small), will be described when the preset threshold value is 3. When Nd=2, the situation is the same as with Arrangement Method 2 of Embodiment 1 (FIG. 9), and therefore a description thereof is omitted here.

When Nd=4, as shown in FIG. 20, allocation section 103 allocates a Dch data symbol to an RB #1 subblock, RB #4 subblock, RB #7 subblock, and RB #10 subblock forming Dch #1, an RB #1 subblock, RB #4 subblock, RB #7 subblock, and RB #10 subblock forming Dch #2, an RB #1 subblock, RB #4 subblock, RB #7 subblock, and RB #10 subblock forming Dch #3, and an RB #1 subblock, RB #4 subblock, RB #7 subblock, and RB #10 subblock forming Dch #4, in accordance with Arrangement Method 1 (FIG. 19). That is to say, as shown in FIG. 20, a Dch data symbol is allocated to RB #1, #4, #7, #10.

Also, as shown in FIG. 20, allocation section 103 allocates an Lch data symbol to remaining RB #2, #3, #5, #6, #8, #9, #11, #12 other than the RBs to which a Dch data symbol has been allocated. That is to say, Lch #2, #3, #5, #6, #8, #9, #11, #12 shown in FIG. 3 are used for an Lch data symbol.

Thus, with this switching method, both when Nd=4 (FIG. 20) and when Nd=2 (FIG. 9), a Dch data symbol is allocated to RB #1, RB #4, RB #7, and RB #10, and an Lch data symbol is allocated to RB #2, #3, #5, #6, #8, #9, #11, #12.

That is to say, when the value of Nd is large (when the number of RBs consecutive in the frequency domain that can be used for Lch's is small), using Arrangement Method 1 enables the number of RBs consecutive in the frequency domain that can be used for Lch's to be maximized while obtaining a frequency diversity effect. On the other hand, when the value of Nd is small (when the frequency diversity effect is small), using Arrangement Method 2 enables the frequency diversity effect to be improved while securing RBs consecutive in the frequency domain that can be used for Lch's.

Thus, according to this switching method, when the number of subblock divisions per RB is large, switching is performed to an arrangement method whereby RBs consecutive in the frequency domain that can be used for Lch's are obtained preferentially, whereas when the number of subblock divisions per RB is small, switching is performed to an arrangement method whereby a frequency diversity effect is obtained preferentially. By this means, in both cases regarding the number of subblock divisions per RB, a frequency diversity effect and a frequency scheduling effect can both be improved. Also, according to this switching method, Lch's used in frequency scheduling transmission are secured in RBs that are consecutive in the frequency domain, enabling control information for reporting an Lch allocation result to be reduced.

Also, according to this switching method, the larger the number of mobile stations or the number of Dch's, the larger is the value of Nd that may be used. Consequently, when the number of mobile stations or the number of a plurality of mutually different Dch's is larger, the same Dch is allocated to a larger number of different RBs, enabling a frequency diversity effect for one Dch to be further improved. On the other hand, when the number of mobile stations or the number of a plurality of mutually different Dch's is smaller, the number of a plurality of mutually different Dch's per RB decreases, enabling the occurrence of vacancies occurring in some per-RB subblocks to be prevented, and enabling a fall in communication resource utilization efficiency to be prevented. For example, when Nd=4, vacancies occur in some subblocks of one RB when the number of a plurality of mutually different Dch's is less than four. However, making the value of Nd less than 4 results in a higher possibility of all of a plurality of subblocks included in one RB being used, enabling a fall in communication resource utilization efficiency to be prevented.

<Switching Method 2>

With this switching method, the arrangement method is switched according to a channel state, such as channel frequency selectivity, for example.

When frequency selectivity is moderate, RBs with high channel quality tend to be consecutive in the frequency domain, making this situation suitable for frequency scheduling transmission. On the other hand, when frequency selectivity is significant, RBs with high channel quality tend to be distributed in the frequency domain, making this situation suitable for frequency diversity transmission.

Thus, allocation section 103 allocates Dch's using Arrangement Method 1 when frequency selectivity is moderate, and allocates Dch's using Arrangement Method 2 when frequency selectivity is significant.

When frequency selectivity is moderate (when RBs with high channel quality are consecutive in the frequency domain), using Arrangement Method 1 enables RBs consecutive in the frequency domain to be used for Lch's, enabling a frequency scheduling effect to be improved. Also, since Lch's are secured in RBs that are consecutive in the frequency domain, control information for reporting an Lch allocation result can be reduced.

On the other hand, when frequency selectivity is significant (when RBs with high channel quality are distributed in the frequency domain), using Arrangement Method 2 results in Lch's being distributively allocated in the frequency domain, enabling frequency scheduling to be performed using RBs with high channel quality that are distributed across a wide band.

Thus, according to this switching method, arrangement method switching is performed according to frequency selectivity, and therefore whatever the frequency selectivity situation, a frequency scheduling effect for Lch's can be improved while obtaining a frequency diversity effect for Dch's.

Frequency selectivity used in this switching method can be measured by means of channel delay dispersion (delayed wave spread), for example.

Also, since frequency selectivity differs according to cell size and cell conditions, this switching method may be applied on a cell-by-cell basis, and the arrangement method may be switched on a cell-by-cell basis. Furthermore, since frequency selectivity also differs for each mobile station, this switching method may be applied on an individual mobile station basis.

<Switching Method 3>

With this switching method, the arrangement method is switched according to system bandwidth—that is, a bandwidth in which RBs are allocated.

The narrower the system bandwidth, the smaller is the frequency interval between RBs used for Dch's. Consequently, a frequency diversity effect is not improved however many Dch's are distributively arranged in the frequency domain.

On the other hand, the wider the system bandwidth, the larger is the frequency interval between RBs used for Dch's. Consequently, when a plurality of Dch's are distributively arranged in the frequency domain, a large number of RBs consecutive in the frequency domain, proportional to the frequency interval between RBs used for Dch's, can be secured for Lch's, enabling a frequency scheduling effect to be obtained.

Thus, allocation section 103 allocates Dch's using Arrangement Method 1 when system bandwidth is narrow, and allocates Dch's using Arrangement Method 2 when system bandwidth is wide.

In this way, when system bandwidth is narrow, using Arrangement Method 1 enables RBs consecutive in the frequency domain that can be used for Lch's to be secured preferentially, rather than obtaining a frequency diversity effect. On the other hand, when system bandwidth is wide, using Arrangement Method 2 enables a frequency diversity effect to be improved without impairing a frequency scheduling effect.

Thus, according to this switching method, the arrangement method is switched according to system bandwidth, and therefore an optimal frequency scheduling effect can always be obtained whatever the system bandwidth. Also, since Lch's are secured in RBs that are consecutive in the frequency domain, control information for reporting an Lch allocation result can be reduced.

This concludes a description of Switching Methods 1 through 3 used by allocation section 103 of this embodiment.

Thus, according to this embodiment, switching between Dch arrangement methods is performed according to the communication environment, enabling Lch frequency scheduling transmission and Dch frequency diversity transmission to be performed optimally at all times according to the communication environment.

In this embodiment, cases have been described in which arrangement method switching is performed by allocation section 103 (FIG. 1), but arrangement method switching need not be performed by allocation section 103. For example, an arrangement method switching section (not shown) may perform arrangement method switching according to the communication environment, and issue an arrangement method directive to allocation section 103.

Also, in this embodiment, cases have been described in which allocation section 103 (FIG. 1) switches between Arrangement Method 1 and Arrangement Method 2, but allocation section 103 can obtain the same kind of effect as described above, and the effect explained in the description of Arrangement Method 3 of Embodiment 1, by using Arrangement Method 3 of Embodiment 1 instead of Arrangement Method 2. Allocation section 103 may also switch among Arrangement Methods 1 through 3 according to the communication environment.

Furthermore, in this embodiment, when performing arrangement method switching, relational expressions Equation (1) and Equation (2) showing a relationship between a Dch channel number and the RB number of an RB in which that Dch is arranged, or a relational expression variable such as q(k), may be switched. Also, in this embodiment, these relational expression variables may be reported to a mobile station. By this means, a mobile station can switch to an appropriate arrangement method each time arrangement method switching is performed, and can thus determine a Dch allocated to it.

Embodiment 3

In this embodiment a case will be described in which only one Dch is arranged in one RB (the number of subblock divisions per RB is one).

First, a relational expression for a Dch channel number and the RB number of an RB in which that Dch is arranged will be shown.

RB number j of an RB in which a Dch with channel number k is arranged is given by Equation (3) below.

[3]

$$j=q(k) \qquad \text{(Equation 3)}$$

where k=1, 2, . . . , Nrb, and q(k) is given by an M-row×(Nrb/M)-column block interleaver where M is an arbitrary positive integer.

Figure 21:
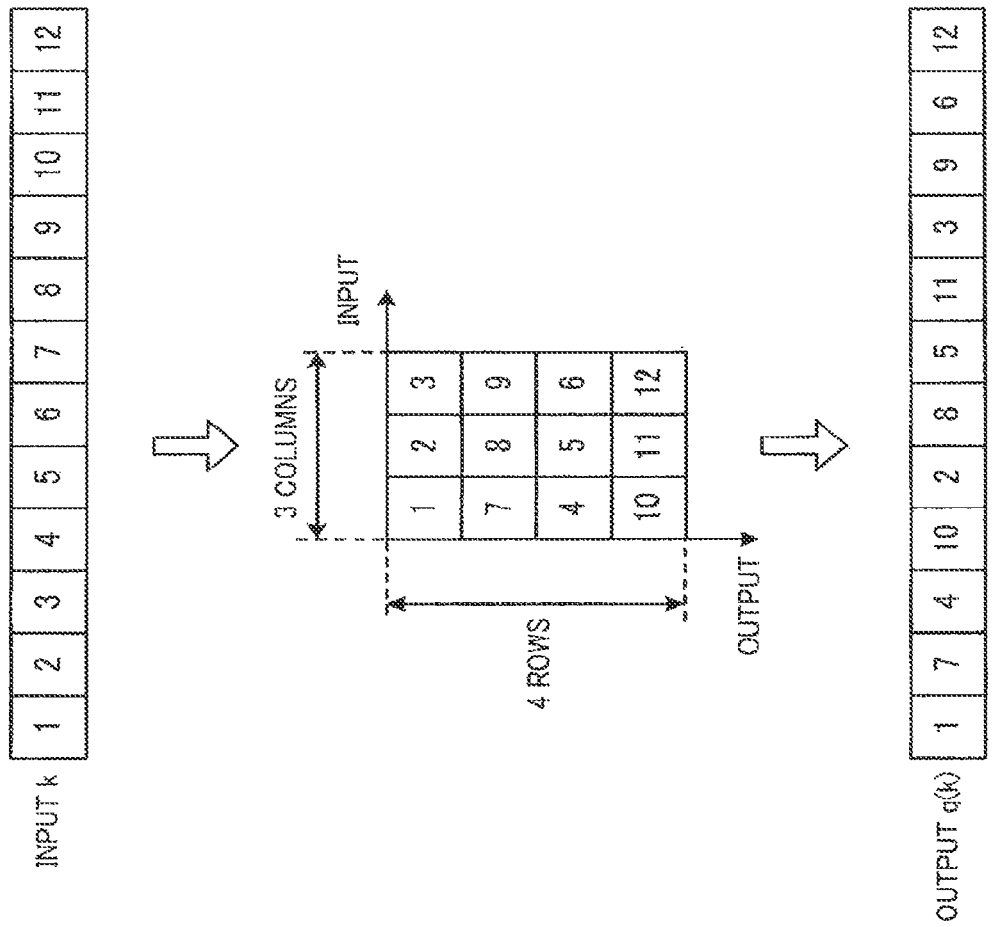
FIG. 21 is a drawing showing a block interleaver according to Embodiment 3 of the present invention.

If it is assumed here that Nrb=12 and M=4, q(k) is given by the 4-row×3-column block interleaver shown in FIG. 21. That is to say, as shown in FIG. 21, q(k)=1, 7, 4, 10, 2, 8, 5, 11, 3, 9, 6, 12 is obtained for k=1, 2, 3, 4, 5, 6, 7, 8, 9, 10, 11, 12. Thus, Dch #(k) is distributively arranged in RB #(q(k)).

Figure 22:
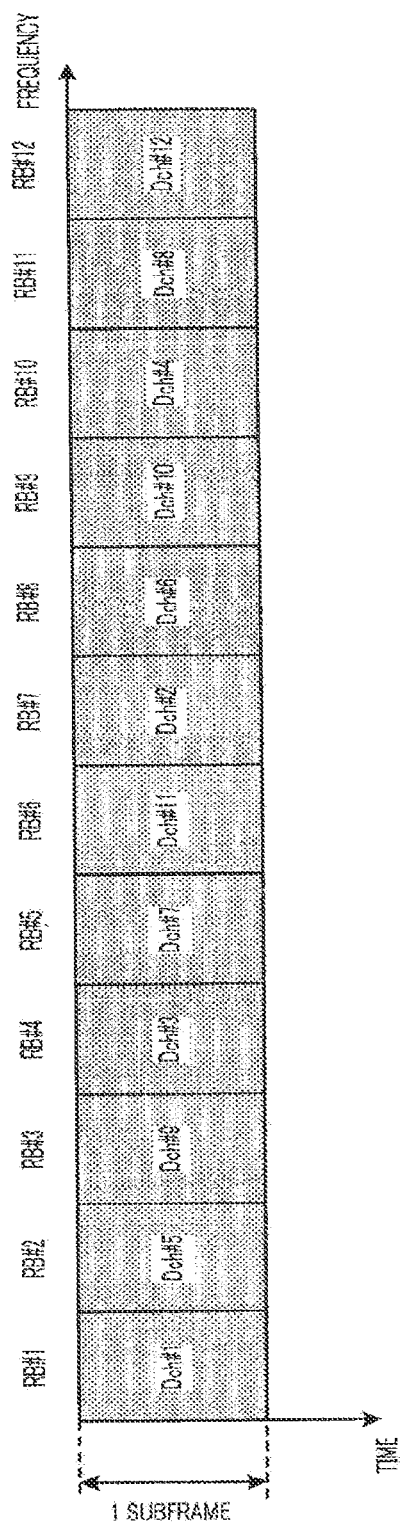
FIG. 22 shows a Dch arrangement method according to Embodiment 3 of the present invention.

Specifically, as shown in FIG. 22, Dch #1 is arranged in RB #1, Dch #5 is arranged in RB #2, Dch #9 is arranged in RB #3, Dch #3 is arranged in RB #4, Dch #7 is arranged in RB #5, Dch #11 is arranged in RB #6, Dch #2 is arranged in RB #7, Dch #6 is arranged in RB #8, Dch #10 is arranged in RB #9, Dch #4 is arranged in RB #10, Dch #8 is arranged in RB #11, and Dch #12 is arranged in RB #12.

Thus, when using Lch's (FIG. 3), Lch #1 through #12 with consecutive channel numbers are arranged in order in RB #1 through #12, whereas when using Dch's (FIG. 22), Dch's with consecutive channel numbers are arranged in RBs that are distributively arranged in terms of frequency. That is to say, different channel numbers are set for each RB of RB #1 through #12 when Lch's are used and when Dch's are used.

Figure 23:
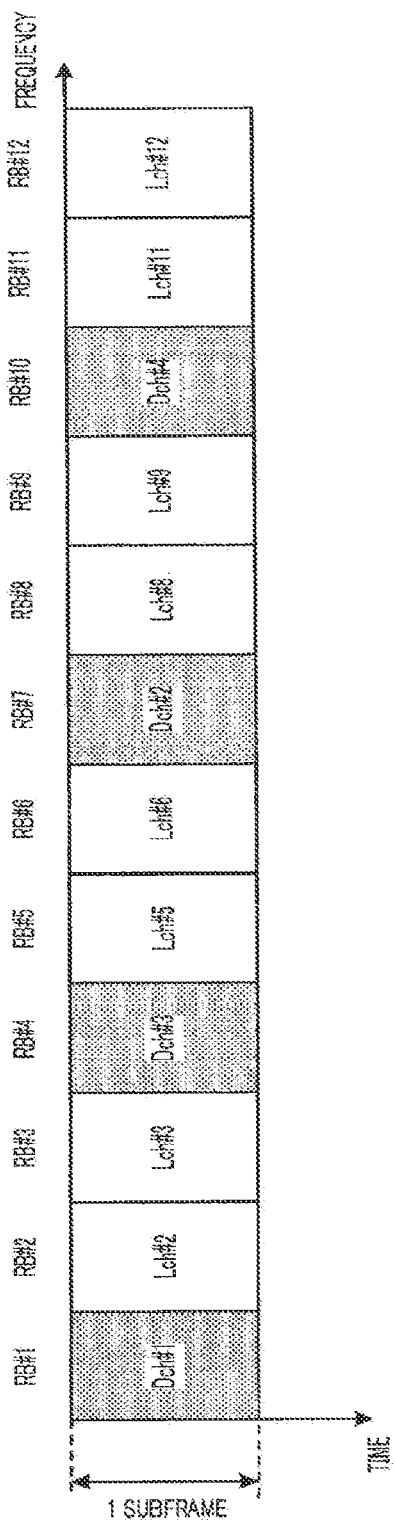
FIG. 23 shows an example of allocation according to Embodiment 3 of the present invention.

As in Embodiment 1, an example of allocation by allocation section 103 of base station 100 (FIG. 1) when four consecutive Dch's, Dch #1 through #4, are used for a Dch data symbol of one mobile station is shown in FIG. 23. Here, allocation section 103 holds the Dch arrangement pattern shown in FIG. 22, and allocates a Dch data symbol to RBs in accordance with the arrangement pattern shown in FIG. 22.

As shown in FIG. 23, allocation section 103 allocates a Dch data symbol to RB #1 in which Dch #1 is arranged, RB #7 in which Dch #2 is arranged, RB #4 in which Dch #3 is arranged, and RB #10 in which Dch #4 is arranged. That is to say, as shown in FIG. 23, a Dch data symbol is allocated to RB #1, #4, #7, #10.

Also, as shown in FIG. 23, allocation section 103 allocates an Lch data symbol to remaining RB #2, #3, #5, #6, #8, #9, #11, #12 other than the RBs to which a Dch data symbol has been allocated. That is to say, Lch #2, #3, #5, #6, #8, #9, #11, #12 shown in FIG. 3 are used for an Lch data symbol.

Next, as in Embodiment 1, an example of extraction by demapping section 207 of mobile station 200 (FIG. 2) will be described for a case in which a Dch data symbol using four consecutive Dch's, Dch #1 through #4, is allocated to mobile station 200. Here, demapping section 207 holds the Dch arrangement pattern shown in FIG. 22, the same as allocation section 103, and extracts a Dch data symbol from a plurality of RBs in accordance with the arrangement pattern shown in FIG. 22. First channel number Dch #1 and last channel number Dch #4 are indicated in Dch data symbol allocation information reported to mobile station 200 from base station 100.

Since the Dch channel numbers indicated in the Dch data symbol allocation information are Dch #1 and Dch #4, demapping section 207 identifies the fact that Dch's used for a Dch data symbol addressed to that station are the four consecutive Dch's Dch #1 through #4. Then, following a similar procedure to allocation section 103, demapping section 207 extracts Dch #1 arranged in RB #1, Dch #2 arranged in RB #7, Dch #3 arranged in RB #4, and Dch #4 arranged in RB #10, as shown in FIG. 23. That is to say, demapping section 207 extracts a Dch data symbol allocated to RB #1, #4, #7, #10, as shown in FIG. 23, as a data symbol addressed to that station.

In this embodiment, as with Arrangement Methods 1 through 3 of Embodiment 1, a Dch data symbol is allocated to four RBs, and an Lch data symbol is allocated to eight RBs. Also, in this embodiment, a Dch data symbol is distributively allocated every three RBs, to RB #1, RB #4, RB #7, and RB #10, as shown in FIG. 23, enabling a frequency diversity effect to be improved. Furthermore, as shown in FIG. 23, having a Dch data symbol allocated to distributively arranged RBs also means that an Lch data symbol is distributed, making it possible to perform frequency scheduling using RBs across a wider band.

Thus, in this embodiment, only one Dch is arranged in one RB, and a plurality of different Dch's with consecutive channel numbers are arranged in RBs that are distributively arranged in the frequency domain. By this means, when a plurality of Dch's are allocated to one mobile station, non-use of some RBs is completely eliminated, and a frequency diversity effect can be obtained.

Also, according to this embodiment, Dch's with consecutive channel numbers are arranged in RBs that are distributively arranged in the frequency domain, but Dch channel numbers and RB numbers are mutually mapped in advance, enabling control information for reporting a Dch allocation result to be reduced in the same way as in Embodiment 1.

Embodiment 4

In this embodiment a case will be described in which switching between use of Arrangement Method 1 and Arrangement Method 4 of Embodiment 1 is performed according to per-RB number of subblock divisions Nd.

As described above, Arrangement Method 4 enables more RBs consecutive in the frequency domain that can be used for Lch's to be secured than Arrangement Method 1.

On the other hand, when a large number of Dch's are used, with Arrangement Method 4 the interval between RBs in which Dch's are arranged differs greatly according to the Dch, and therefore a frequency diversity effect due to Dch's is non-uniform. Specifically, in FIG. 15 Dch #1 is arranged in RB #1 and #12, and therefore the RB interval is 11 RBs and a large frequency diversity effect is obtained, but Dch #12 is arranged in RB #6 and #7, and therefore the RB interval is 1 and the frequency diversity effect is small.

On the other hand, with Arrangement Method 1 the interval between RBs in which one Dch is arranged is uniform, enabling a uniform frequency diversity effect to be obtained irrespective of the Dch.

Also, as stated above, by using a larger value of Nd the larger the number of mobile stations or the number of Dch's used, a frequency diversity effect can be further improved while preventing a fall in communication resource utilization efficiency.

Thus, in this embodiment, allocation section 103 allocates Dch's using Arrangement Method 1 when the value of Nd is large—that is, when more Dch's are allocated—and allocates Dch's using Arrangement Method 4 when the value of Nd is small—that is, when fewer Dch's are allocated. Specifically, allocation section 103 performs arrangement method switching based on a comparison between Nd and a preset threshold value. That is to say, allocation section 103 switches to Arrangement Method 1 when Nd is greater than or equal to the threshold value, and switches to Arrangement Method 4 when Nd is less than the threshold value.

For example, the Dch arrangement shown in FIG. 15 is used when Nd=2, and the kind of arrangement shown in FIG. 19 is used when Nd=4.

By this means, a frequency diversity effect can be improved whether the number of Dch's is large or small. That is to say, when the value of Nd is large (when the number of Dch's is large), an arrangement is adopted that allows uniformly good frequency diversity to be obtained for all Dch's, and when the value of Nd is small (when the number of Dch's is small), an arrangement is adopted that enables a frequency diversity effect to be improved for a specific Dch. Here, when the number of Dch's is small, nonuniformity of a frequency diversity effect with Arrangement Method 4 is not a problem if Dch's in the vicinity of both ends of the band (that is, low-numbered Dch's in FIG. 15) are used preferentially.

Using Arrangement Method 4 when the value of Nd is small (when the number of Dch's is small) enables more consecutive Lch RBs to be secured, and enables a consecutive RB allocation reporting method to be used for more Lch's. When the number of mobile stations is small, one mobile station often occupies a large number of RBs when communicating, and there is consequently a large communication efficiency improvement effect. Using Arrangement Method 1 when the value of Nd is large (when the number of Dch's is large) enables more distributed Lch RBs to be secured. When the number of mobile stations is large, the more distributed Lch's are for use of resources by a plurality of mobile stations, the greater is a frequency scheduling effect, and consequently the more communication efficiency improves.

Since the ratio between the number of mobile stations using Dch's and the number of mobile stations using Lch's is generally constant irrespective of the total number of mobile stations, this embodiment is effective.

Thus, according to this embodiment, a good frequency diversity effect is obtained irrespective of the number of mobile stations, and communication efficiency can be improved.

Embodiment 5

In this embodiment, the fact that Dch's with consecutive channel numbers are arranged in different RBs and Dch's with channel numbers within a predetermined number are arranged in one RB is the same as in Arrangement Method 3 of Embodiment 1, but Dch's are arranged using a different block interleaver from that in Arrangement Method 3 of Embodiment 1.

This is described in concrete terms below. Here, as with Arrangement Method 3 of Embodiment 1, it is assumed that Nrb=12, Nd=2, and the predetermined number is 2. Also, Lch #1 through #12 or Dch #1 through #12 are formed by means of RBs.

Figure 24:
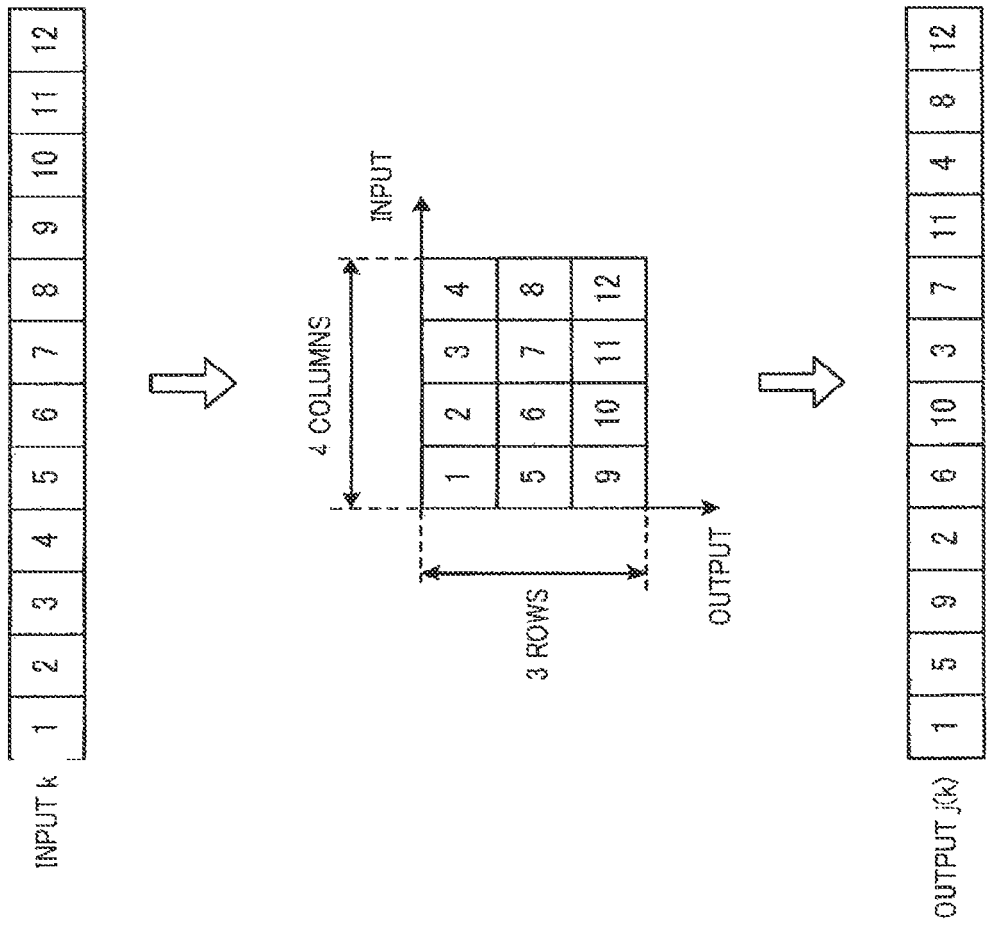
FIG. 24 is a drawing showing a block interleaver according to Embodiment 5 of the present invention (when Nrb=12)

In this embodiment, Dch channel numbers are given by the 3-row×4-column block interleaver shown in FIG. 24. Specifically, Dch channel numbers k=1, 2, . . . , Nrb are input to the block interleaver shown in FIG. 24, and Dch channel numbers j(k) are output. That is to say, Dch channel numbers are rearranged by the block interleaver shown in FIG. 24. Then, if k≤floor(Nrb/Nd), the RB numbers of RBs in which Dch #(j(k)) is arranged become RB #(k) and RB #(k+floor (Nrb/Nd)). On the other hand, if k>floor(Nrb/Nd), the RB numbers of RBs in which Dch #(j(k)) is arranged become RB #(k) and RB #(k-floor(Nrb/Nd)). Here, floor(Nrb/Nd) represents an interval between RBs in which one Dch is arranged.

Here, since Nrb=12 and Nd=2, floor(Nrb/Nd)=6. Also, as regards j(k), j(k)=1, 5, 9, 2, 6, 10, 3, 7, 11, 4, 8, 12 is obtained for k=1, 2, 3, 4, 5, 6, 7, 8, 9, 10, 11, 12, as shown in FIG. 24. Thus, when k≤6, Dch #(j(k)) is distributively arranged in two RBs, RB #(k) and RB #(k+6), separated by a 6 (=floor (12/2)) RB interval in the frequency domain, and when k>6, Dch #(j(k)) is distributively arranged in two RBs, RB #(k) and RB #(k-6), separated by a 6 RB interval in the frequency domain.

Specifically, when k=1, j(k)=1, and therefore Dch #1 is distributively arranged in RB #1 and RB #7 (=1+6), and when k=2, j(k)=5, and therefore Dch #5 is distributively arranged in RB #2 and RB #8 (=2+6). The above explanation can be applied when k=3 through 6.

Also, when k=7, j(k)=3, and therefore Dch #3 is distributively arranged in RB #7 and RB #1 (=7-6), and when k=8, j(k)=7, and therefore Dch #7 is distributively arranged in RB #8 and RB #2 (=8-6). The above explanation can be applied when k=9 through 12.

By this means, as shown in FIG. 11, Dch #1 and #3 are arranged in RB #1 (RB #7), Dch #5 and #7 are arranged in RB #2 (RB #8), Dch #9 and #11 are arranged in RB #3 (RB #9), Dch #2 and #4 are arranged in RB #4 (RB #10), Dch #6 and #8 are arranged in RB #5 (RB #11), and Dch #10 and #12 are arranged in RB #6 (RB #12), in the same way as in Arrangement Method 3 of Embodiment 1. That is to say, Dch's with consecutive channel numbers are arranged in different RBs, and Dch's with channel numbers within a predetermined number (here, 2) are arranged in one RB. Thus, the same kind of effect as in Arrangement Method 3 of Embodiment 1 can also be obtained when Dch channel numbers are interleaved using the block interleaver shown in FIG. 24.

Here, channel numbers j(k)=1, 5, 9, 2, 6, and 10 of the first half of the block interleaver output shown in FIG. 24 (that is, the first and second columns of the block interleaver), and channel numbers j(k)=3, 7, 11, 4, 8, and 12 of the second half of the block interleaver output shown in FIG. 24 (that is, the third and fourth columns of the block interleaver), are arranged in the same RBs as shown in FIG. 11. That is to say, channel numbers located at the same position in the 3-row×2-column first half of the block interleaver shown in FIG. 24 comprising the first and second columns, and the 3-row×2-column second half of the block interleaver shown in FIG. 24 comprising the third and fourth columns, have a correspondence relationship of being arranged in the same RBs. For example, channel number 1 located in the first column of the first row of the first half (the first column of the first row of the block interleaver shown in FIG. 24), and channel number 3 located in the first column of the first row of the second half (the third column of the first row of the block interleaver shown in FIG. 24), are arranged in the same RBs (RB #1 and #7 shown in FIG. 11). Similarly, channel number 5 located in the first column of the second row of the first half (the first column of the second row of the block interleaver shown in FIG. 24), and channel number 7 located in the first column of the second row of the second half (the third column of the second row of the block interleaver shown in FIG. 24), are arranged in the same RBs (RB #2 and #8 shown in FIG. 11). The above explanation can be applied to other positions.

Also, channel numbers located at the same position in the first half and second half of the block interleaver output are channel numbers separated by (number of columns/Nd). Therefore, by making the number of columns of the block interleaver 4, as shown in FIG. 24, Dch's with channel numbers separated by only two channel numbers are arranged in the same RB. That is to say, Dch's with channel numbers within a predetermined number (number of columns/Nd) are arranged in the same RB. In other words, the difference between channel numbers of Dch's arranged in one RB can be kept within a predetermined number by making the number of columns of a block interleaver [predetermined number×Nd].

Next, a channel arrangement method will be described for a case in which the number of Dch channels (corresponding here to number of RBs Nrb) is not divisible by the number of columns of the block interleaver.

This is described in concrete terms below. It is assumed here that Nrb=14, Nd=2, and the predetermined number is 2. Also, Lch #1 through #14 or Dch #1 through #14 are formed by means of RBs. Since Nd=2 and the predetermined number is 2, the number of columns of the block interleaver is 4. Thus, with regard to the block interleaver size, the number of columns is fixed at 4, and the number of rows is calculated as ceil(Nrb/number of columns), where operator ceil(x) represents the smallest integer that exceeds x. That is to say, a 4 (=ceil(14/4))-row×4-column block interleaver such as shown in FIG. 25 is used here.

Figure 25:
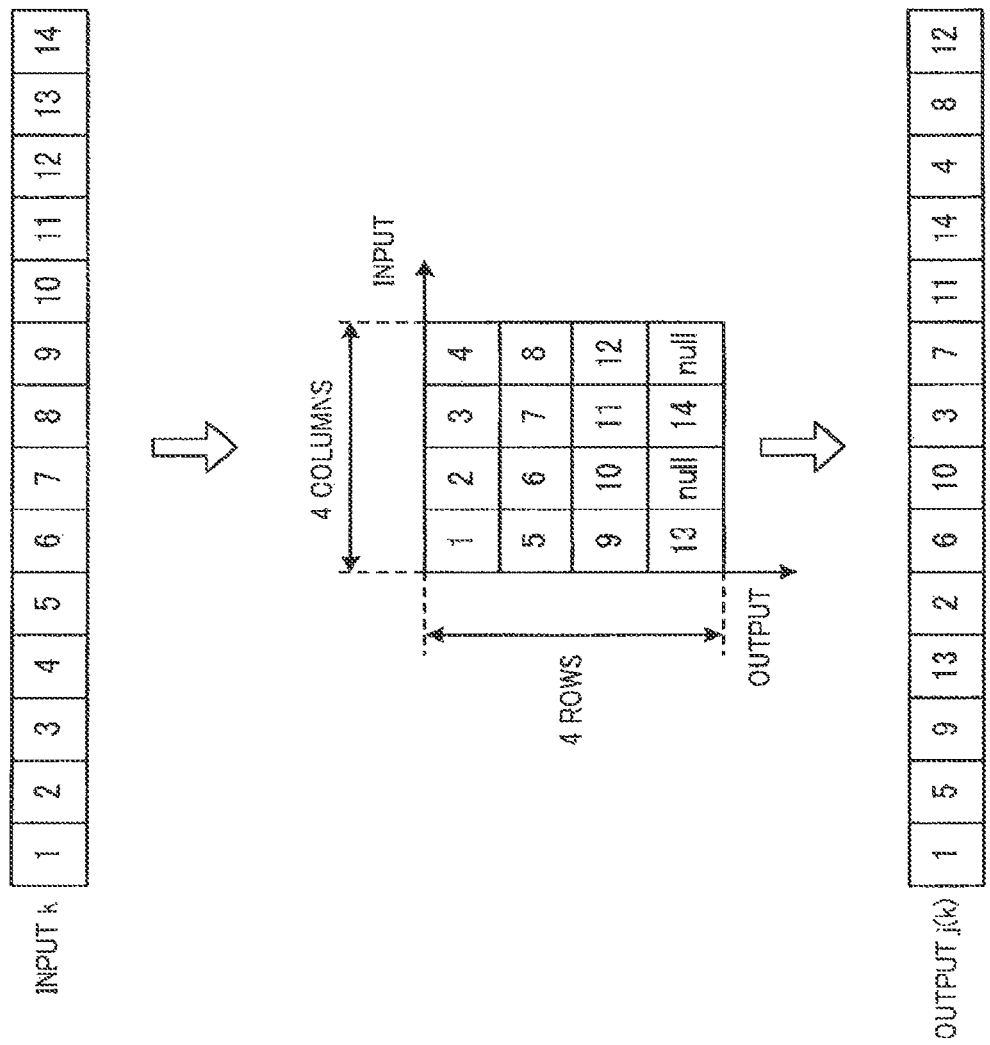
FIG. 25 is a drawing showing a block interleaver according to Embodiment 5 of the present invention (when Nrb=14)

While the size of the block interleaver shown in FIG. 25 is 16 (=4 rows×4 columns), Dch channel numbers k=1, 2, ..., Nrb that are input to the block interleaver are only 14 in number. That is to say, the number of Dch channels is smaller than the size of the block interleaver, and the number of Dch channels (14) is not divisible by the number of columns of the block interleaver (4).

Thus, in this embodiment, a number of Nulls equivalent to the difference between the size of the block interleaver and the number of Dch channels are inserted in the block interleaver. That is to say, two (=16−14) Nulls are inserted in the block interleaver as shown in FIG. 25. Specifically, two Nulls are inserted uniformly in the last fourth-row of the block interleaver. In other words, two Nulls are inserted at every other position in the last fourth-row of the block interleaver. That is to say, as shown in FIG. 25, Nulls are inserted in the second column and fourth column of the fourth row within the 4-row×4-column block interleaver. Thus, as shown in FIG. 25, Dch channel numbers k=1 through 14 are input in the column direction at positions other than those of the Nulls in the second column and fourth column of the last fourth-row. That is to say, in the last row of the block interleaver, Dch channel numbers k=13 and 14 are inserted at every other position in the column direction. When Nd=2, two mutually different Dch's are distributively arranged in each subblock of two RBs, and therefore the total number of Dch channels is an even number. Consequently, only cases in which the number of Nulls inserted in a block interleaver in which the number of columns is 4 is 0 or 2 are possible.

Here, since Nrb=14 and Nd=2, floor(Nrb/Nd)=7. Also, j(k) is given by a 4-row×4-column block interleaver as shown in FIG. 25. The Nulls inserted in the block interleaver shown in FIG. 25 are skipped when block interleaver output is performed, and are not output as j(k). That is to say, j(k)=1, 5, 9, 13, 2, 6, 10, 3, 7, 11, 14, 4, 8, 12 is obtained for k=1, 2, 3, 4, 5, 6, 7, 8, 9, 10, 11, 12, 13, 14, as shown in FIG. 25. Thus, when k≤7, Dch #(j(k)) is distributively arranged in two RBs, RB #(k) and RB #(k+7), separated by a 7 (=floor (14/2)) RB interval in the frequency domain, and when k>7, Dch #(j(k)) is distributively arranged in two RBs, RB #(k) and RB #(k−7), separated by a 7 RB interval in the frequency domain.

Specifically, when k=1, j(k)=1, and therefore Dch #1 is distributively arranged in RB #1 and RB #8 (=1+7), and when k=2, j(k)=5, and therefore Dch #5 is distributively arranged in RB #2 and RB #9 (=2+7). The above explanation can be applied when k=3 through 7.

Also, when k=8, j(k)=3, and therefore Dch #3 is distributively arranged in RB #8 and RB #1 (=8−7), and when k=9, j(k)=7, and therefore Dch #7 is distributively arranged in RB #9 and RB #2 (=9−7). The above explanation can be applied when k=10 through 14.

Figure 26:
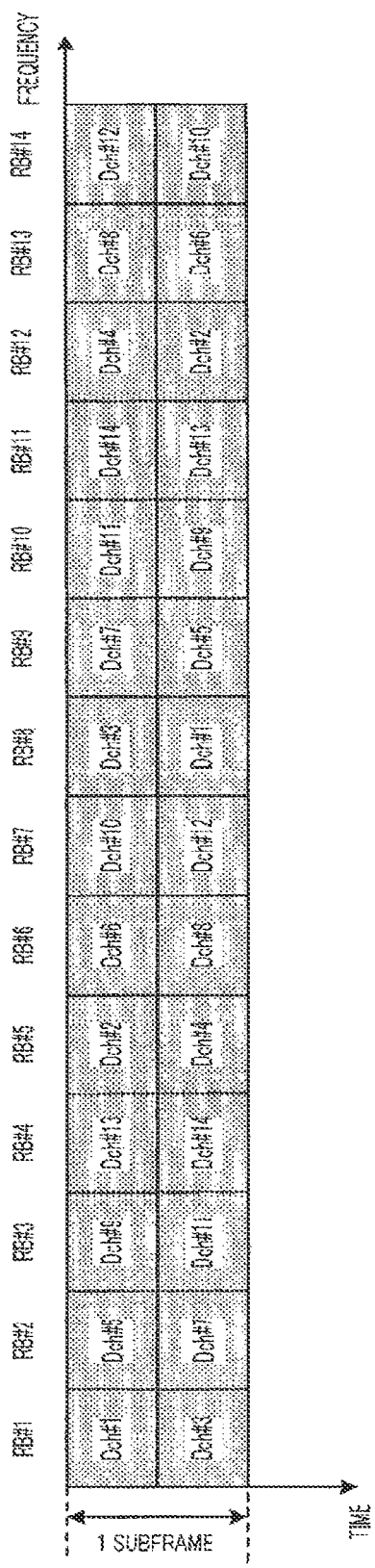
FIG. 26 shows a Dch arrangement method according to Embodiment 5 of the present invention (when Nrb=14)

By this means, as shown in FIG. 26, Dch #1 and #3 are arranged in RB #1 (RB #8), Dch #5 and #7 are arranged in RB #2 (RB #9), Dch #9 and #11 are arranged in RB #3 (RB #10), Dch #13 and #14 are arranged in RB #4 (RB #11), Dch #2 and #4 are arranged in RB #5 (RB #12), Dch #6 and #8 are arranged in RB #6 (RB #13), and Dch #10 and #12 are arranged in RB #7 (RB #14). That is to say, two Dch's with channel numbers within predetermined number 2 are arranged in all RBs, as shown in FIG. 26.

Similarly to the case of the block interleaver shown in FIG. 24, channel numbers j(k)=1, 5, 9, 13, 2, 6, and 10 of the first half of the block interleaver output shown in FIG. 25 (that is, the first and second columns of the block interleaver), and channel numbers j(k)=3, 7, 11, 14, 4, 8, and 12 of the second half of the block interleaver output (that is, the third and fourth columns of the block interleaver), are arranged in the same RBs as shown in FIG. 26. Here, one of the two Nulls inserted in the block interleaver shown in FIG. 25 is inserted in the 4-row×2-column first half of the block interleaver shown in FIG. 25 comprising the first and second columns, and the other of the two Nulls is inserted in the 4-row×2-column second half of the block interleaver comprising the third and fourth columns. The positions at which the two Nulls are inserted are the second column of the fourth row of the first half of block interleaver output (the second column of the fourth row of the block interleaver shown in FIG. 25), and the second column of the fourth row of the second half of block interleaver output (the fourth column of the fourth row of the block interleaver shown in FIG. 25). That is to say, the two Nulls are inserted at the same positions in the first half and second half of the block interleaver shown in FIG. 25. That is to say, the two Nulls are inserted at positions that can be arranged in the same RB in the block interleaver. Consequently, for Dch channel numbers input at positions other than positions at which a Null is inserted, also, a correspondence relationship whereby channel numbers within a predetermined number (number of columns/Nd) are arranged in the same RB is maintained. Therefore, Dch's with channel numbers within a predetermined number (number of columns/Nd) are arranged in the same RB even if the number of Dch channels is smaller than the size of the block interleaver.

Figure 27:
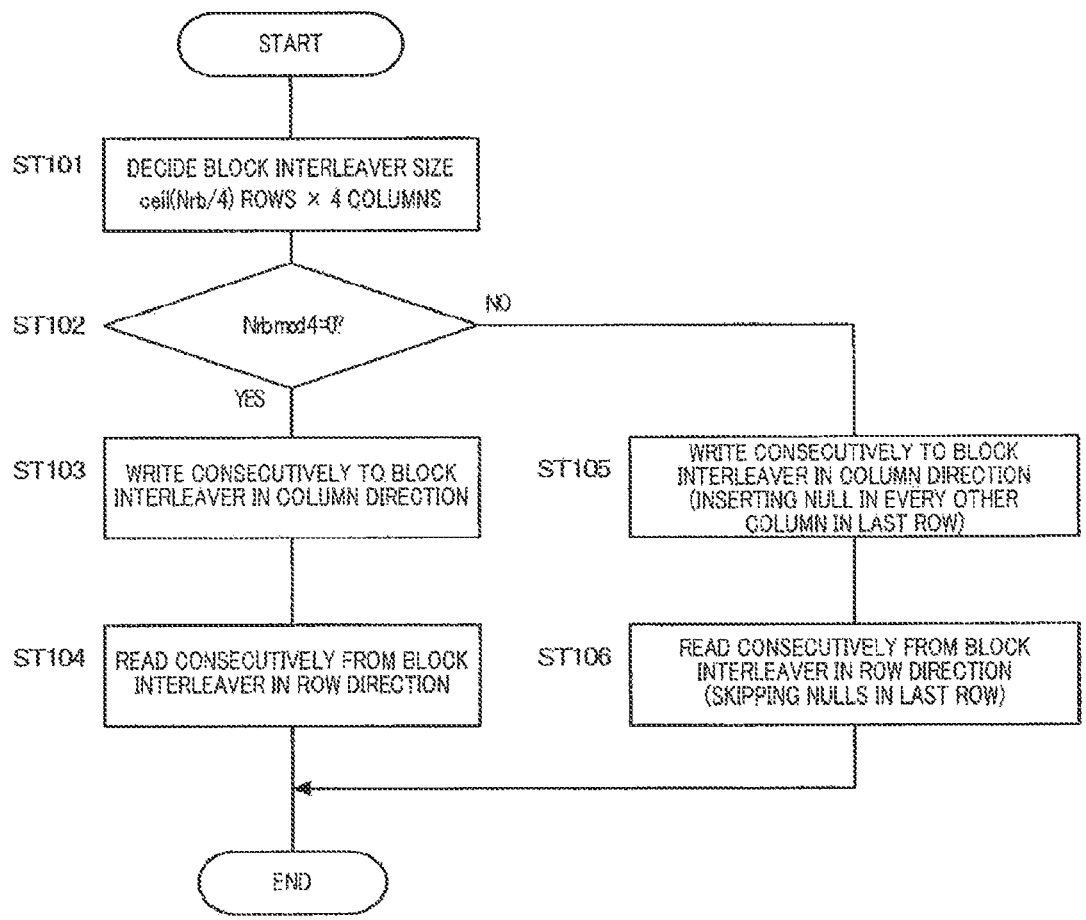
FIG. 27 is a flowchart showing block interleaver input/output processing according to Embodiment 5 of the present invention.

Next, the input/output processing flow of the block interleaver shown in FIG. 25 will be described using FIG. 27. Here, the number of rows of the block interleaver is fixed at 4.

In step (hereinafter referred to as "ST") 101, the size of the block interleaver is decided as ceil(Nrb/4) rows×4 columns.

In ST102, it is determined whether or not number of RBs Nrb is divisible by 4. Here, operator mod shown in FIG. 27 indicates a modulo operator.

If number of RBs Nrb is determined to be divisible by 4 in ST102 (ST102: YES), in ST103 Dch channel numbers (k) are written consecutively to the block interleaver in the column direction.

In ST104, Dch channel numbers (j(k)) are read consecutively from the block interleaver in the row direction.

On the other hand, if number of RBs Nrb is determined not to be divisible by 4 in ST102 (ST102: NO), in ST105 Dch channel numbers (k) are written consecutively to the block interleaver in the column direction, in the same way as in ST103. However, a Null is inserted in every other column in the last row (for example, the fourth row shown in FIG. 25) of the block interleaver.

In ST106, Dch channel numbers (j(k)) are read consecutively from the block interleaver in the row direction in the same way as in ST104. However Dch channel numbers (j(k)) are read in which Nulls inserted at the time of block interleaver writing (for example, the second column and fourth column of the fourth row shown in FIG. 25) are skipped.

Thus, if the number of Dch channels is not divisible by the number of columns of the block interleaver, at the time of block interleaver input Dch channel numbers k are written with Nulls inserted, and at the time of block interleaver output Dch channel numbers (k) are read with the Nulls skipped. By this means, even if the number of Dch channels is not divisible by the number of columns of the block interleaver, Dch's with consecutive channel numbers can be arranged in different RBs, and Dch's with channel numbers within a predetermined number can be arranged in one RB, in the same way as in Arrangement Method 3 of Embodiment 1.

In base station 100 and mobile station 200, Dch's with consecutive channel numbers are arranged in different RBs by means of the above-described Dch channel arrangement method, and RBs for which Dch's with channel numbers within a predetermined number are arranged in one RB, and Dch's, are mutually mapped in advance. That is to say, allocation section 103 of base station 100 (FIG. 1) and demapping section 207 of mobile station 200 (FIG. 2) hold the Dch arrangement pattern shown in FIG. 26 associating RBs with Dch's.

Then, in the same way as in Arrangement Method 3 of Embodiment 1, allocation section 103 of base station 100 allocates a Dch data symbol to RBs in accordance with the Dch arrangement pattern shown in FIG. 26. On the other hand, demapping section 207 of mobile station 200, following a similar procedure to allocation section 103, extracts a Dch data symbol addressed to that station from a plurality of RBs in accordance with the Dch arrangement pattern shown in FIG. 26.

By this means, in the same way as in Arrangement Method 3 of Embodiment 1, when the number of Dch's used for a Dch data symbol of one mobile station is small, although there is a possibility of subblocks other than subblocks allocated within RBs not being used, a frequency diversity effect can be obtained preferentially. Also, even when the number of Dch's used for a Dch data symbol of one mobile station is large—that is, when the number of allocated RBs is large —it is possible to use all subblocks within RBs while obtaining a frequency diversity effect.

Thus, in this embodiment, by interleaving Dch channel numbers, Dch's with consecutive channel numbers are arranged in different RBs, and Dch's with channel numbers within a predetermined number are arranged in one RB. By this means, in the same way as in Arrangement Method 3 of Embodiment 1, when the number of Dch's used for a Dch data symbol of one mobile station is small, a frequency diversity effect can be improved. Also, even when the number of Dch's used for a Dch data symbol of one mobile station is large, a frequency diversity effect can be improved without reducing communication resource utilization efficiency.

Also, in this embodiment, even if the number of Dch channels and the size of the block interleaver do not match and the number of Dch channels is not divisible by the number of columns of the block interleaver, Dch's with consecutive channel numbers can be arranged in different RBs, and Dch's with channel numbers within a predetermined number can be arranged in one RB, by inserting Nulls in the block interleaver. Furthermore, according to this embodiment, it is possible to apply the same block interleaver configuration—that is, the same channel arrangement method—to systems with different numbers of Dch channels simply by inserting Nulls in the block interleaver.

In this embodiment, a case has been described in which number of RBs Nrb is an even number (for example, Nrb=14). However, the same kind of effect as in this embodiment can also be obtained when number of RBs Nrb is an odd number by replacing Nrb with the maximum even number not exceeding Nrb.

Also, in this embodiment, a case has been described in which positions at which two Nulls are inserted are the second column of the fourth row of the first half of block interleaver output (the second column of the fourth row of the block interleaver shown in FIG. 25), and the fourth column of the fourth row of the second half of block interleaver output (the fourth column of the fourth row of the block interleaver shown in FIG. 25). However, in the present invention, it is only necessary for positions at which two Nulls are inserted to be the same position in the first half and second half of block interleaver output. Thus, for example, positions at which two Nulls are inserted may be the first column of the fourth row of the first half of block interleaver output (the first column of the fourth row of the block interleaver shown in FIG. 25), and the first column of the fourth row of the second half of block interleaver output (the third column of the fourth row of the block interleaver shown in FIG. 25). Also, positions at which two Nulls are inserted are not limited to the last row of the block interleaver (for example, the fourth row shown in FIG. 25), but may be in a different row (for example, the first, second, or third row shown in FIG. 25).

This concludes a description of embodiments of the present invention.

In the above embodiments, a channel arrangement method whereby Dch's are arranged in RBs depends on a total number of RBs (Nrb) decided by the system bandwidth. Thus, provision may be made for a base station and mobile station to hold a Dch channel number/RB number correspondence table (such as shown in FIG. 4, FIG. 8, FIG. 11, FIG. 15, or FIG. 26, for example) for each system bandwidth, and at the time of Dch data symbol allocation, to reference a correspondence table corresponding to a system bandwidth to which a Dch data symbol is allocated.

In the above embodiments, a signal received by a base station (that is, a signal transmitted in an uplink by a mobile station) has been described as being transmitted by means of an OFDM scheme, but this signal may also be transmitted by means of a transmitting scheme other than an OFDM scheme, such as a single-carrier scheme or CDMA scheme, for example.

In the above embodiments, a case has been described in which an RB is comprised of a plurality of subcarriers comprised of an OFDM symbol, but the present invention is not limited to this, and it is only necessary for a block to be comprised of consecutive frequencies.

In the above embodiments, a case has been described in which RBs are comprised consecutively in the frequency domain, but RBs may also be comprised consecutively in the time domain.

In the above embodiments, cases have been described that apply to a signal transmitted by a base station (that is, a signal transmitted in a downlink by a base station), but the present invention may also be applied to a signal received by a base station (that is, a signal transmitted in an uplink by a mobile station). In this case, the base station performs adaptive control of RB allocation and so forth for an uplink signal.

In the above embodiments, adaptive modulation is performed only for an Lch, but adaptive modulation may also be similarly performed for a Dch. At this time, a base station may perform adaptive modulation for Dch data based on total-band average received quality information reported from each mobile station.

In the above embodiments, an RB used for a Dch has been described as being divided into a plurality of subblocks in the time domain, but an RB used for a Dch may also be divided into a plurality of subblocks in the frequency domain, or may be divided into a plurality of subblocks in the time domain and the frequency domain. That is to say, in one RB, a plurality of Dch's may be frequency-domain-multiplexed, or may be time-domain-multiplexed and frequency-domain-multiplexed.

In these embodiments, a case has been described in which, when a plurality of different Dch's with consecutive channel numbers are allocated to one mobile station, only a first channel number and last channel number are indicated to a mobile station from a base station, but, for example, a first channel number and a number of channels may also be indicated to a mobile station from a base station.

In these embodiments, a case has been described in which one Dch is arranged in RBs distributively arranged at equal intervals in the frequency domain, but one Dch need not be arranged in RBs distributively arranged at equal intervals in the frequency domain.

In the above embodiments, a Dch has been used as a channel for performing frequency diversity transmission, but a channel used is not limited to a Dch, and need only be a channel that is distributively arranged in a plurality of RBs or a plurality of subcarriers in the frequency domain, and enables a frequency diversity effect to be obtained. Also, an Lch has been used as a channel for performing frequency scheduling transmission, but a channel used is not limited to an Lch, and need only be a channel that enables a multi-user diversity effect to be obtained.

A Dch is also referred to as a DVRB (Distributed Virtual Resource Block), and an Lch is also referred to as an LVRB (Localized Virtual Resource Block). Furthermore, an RB used for a Dch is also referred to as a DRB or DPRB (Distributed Physical Resource Block), and an RB used for an Lch is also referred to as an LRB or LPRB (Localized Physical Resource Block), where the DPRB and the LPRB are collectively referred to as a PRB (Physical Resource Block).

A mobile station is also referred to as UE, a base station apparatus as Node B, and a subcarrier as a tone. An RB is also referred to as a subchannel, a subcarrier block, a subcarrier group, a subband, or a chunk. A CP is also referred to as a Guard Interval (GI). A subframe is also referred to as a slot or frame.

In the above embodiments, a case has been described by way of example in which the present invention is configured as hardware, but it is also possible for the present invention to be implemented by software.

The function blocks used in the descriptions of the above embodiments are typically implemented as LSIs, which are integrated circuits. These may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The application of biotechnology or the like is also a possibility.

The disclosures of Japanese Patent Application No. 2007-161958, filed on Jun. 19, 2007, Japanese Patent Application No. 2007-211545, filed on Aug. 14, 2007, and Japanese Patent Application No. 2008-056561, filed on Mar. 6, 2008, including the specifications, drawings and abstracts, are incorporated herein by reference in their entirety.

INDUSTRIAL APPLICABILITY

The present invention is suitable for use in a mobile communication system or the like.

The invention claimed is:
1. A system comprising a transmitting apparatus and a receiving apparatus,
the transmitting apparatus comprising:
first circuitry, which in operation, interleaves consecutive Distributed Virtual Resource Block (DVRB)

numbers and maps DVRBs, the numbers of which being interleaved, to Physical Resource Blocks (PRBs), each PRB being comprised of a plurality of subcarriers; and a transmitter, which, in operation, transmits allocation information indicating one or more DVRBs and transmits data using the PRBs, and the receiving apparatus comprising:

a receiver, which, in operation, receives the allocation information transmitted from the transmitting apparatus and receives the data transmitted from the transmitting apparatus on Physical Resource Blocks (PRBs), second circuitry, which, in operation, decodes the data based on the allocation information, wherein two DVRBs are mapped to PRBs in a same frequency within a subframe, a difference between DVRB numbers of the two DVRBs is less than or equal to two.

2. The system according to claim 1, wherein said first circuitry, in operation, interleaves the DVRB numbers using a block interleaver, which writes the DVRB numbers row by row and reads them out column by column.

3. The system according to claim 1, wherein said first circuitry, in operation, maps the DVRBs to the PRBs such that the DVRBs with consecutive numbers are distributed in a frequency domain.

4. The system according to claim 1, wherein said first circuitry, in operation, allocates one or a plurality of the DVRBs with consecutive numbers to the receiving apparatus.

5. The system according to claim 4, wherein said transmitter, in operation, transmits, to the receiving apparatus, the allocation information, which is based on a starting DVRB number and the total number of one or a plurality of the DVRBs with consecutive numbers that are allocated to the receiving apparatus.

6. The system according to claim 1, wherein said first circuitry, in operation, maps Nd of the DVRBs to the PRBs in the same frequency within a subframe, where Nrb is a total number of the DVRBs, and said circuitry, in operation, maps the DVRBs with the same number to the PRBs that are separated by a gap of Nrb/Nd in a frequency domain.

7. A communication method comprising:

interleaving, at a transmitting apparatus, consecutive Distributed Virtual Resource Block (DVRB) numbers;

mapping, at the transmitting apparatus, DVRBs, the numbers of which being interleaved, to Physical Resource Blocks (PRBs), each PRB being comprised of a plurality of subcarriers;

transmitting, from the transmitting apparatus to a receiving apparatus, allocation information indicating one or more DVRBs;

transmitting, from the transmitting apparatus to a receiving apparatus, data using the PRBs;

receiving, at the receiving apparatus, the allocation information transmitted from the transmitting apparatus;

receiving, at the receiving apparatus, the data transmitted from the transmitting apparatus on Physical Resource Blocks (PRBs); and decoding, at the receiving apparatus, the data based on the allocation information, wherein two DVRBs are mapped to PRBs in a same frequency within a subframe, a difference between DVRB numbers of the two DVRBs is less than or equal to two.

8. The communication method according to claim 7, wherein interleaving includes interleaving the DVRB numbers using a block interleaver, which writes the DVRB numbers row by row and reads them out column by column.

9. The communication method according to claim 7, wherein the mapping includes mapping the DVRBs to the PRBs such that the DVRBs with consecutive numbers are distributed in a frequency domain.

10. The communication method according to claim 7, wherein a plurality of the DVRBs with consecutive numbers are allocated to the receiving apparatus.

11. The communication method according to claim 10, wherein the transmitting includes transmitting, to the mobile station, the allocation information, which is based on a starting DVRB number and the total number of one or a plurality of the DVRBs with consecutive numbers that are allocated to the receiving apparatus.

12. The communication method according to claim 7, wherein the mapping include mapping Nd of the DVRBs to the PRBs in the same frequency within a subframe, where Nrb is a total number of the DVRBs, and said circuitry, in operation, maps the DVRBs with the same number to the PRBs that are separated by a gap of Nrb/Nd in a frequency domain.

* * * * *